US010944595B2

(12) United States Patent
Kim et al.

(10) Patent No.: US 10,944,595 B2
(45) Date of Patent: Mar. 9, 2021

(54) METHOD FOR TRACKING PHASE NOISE IN WIRELESS COMMUNICATION SYSTEM AND DEVICE THEREFOR

(71) Applicant: LG ELECTRONICS INC., Seoul (KR)

(72) Inventors: Kyuseok Kim, Seoul (KR); Hyunsoo Ko, Seoul (KR); Kijun Kim, Seoul (KR); Kilbom Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/483,737

(22) PCT Filed: Oct. 18, 2017

(86) PCT No.: PCT/KR2017/011531
§ 371 (c)(1),
(2) Date: Aug. 5, 2019

(87) PCT Pub. No.: WO2018/143537
PCT Pub. Date: Aug. 9, 2018

(65) Prior Publication Data
US 2020/0052930 A1    Feb. 13, 2020

Related U.S. Application Data

(60) Provisional application No. 62/454,059, filed on Feb. 3, 2017, provisional application No. 62/455,369, filed on (Continued)

(51) Int. Cl.
*H04L 25/02* (2006.01)
*H04L 5/00* (2006.01)
*H04L 27/26* (2006.01)

(52) U.S. Cl.
CPC ........ *H04L 25/0204* (2013.01); *H04L 5/0037* (2013.01); *H04L 25/0224* (2013.01); *H04L 27/2613* (2013.01)

(58) Field of Classification Search
None
See application file for complete search history.

(56) References Cited

FOREIGN PATENT DOCUMENTS

WO    2016010379    1/2016
WO    WO-2016010379 A1 *  1/2016 ........... H04L 5/0051

OTHER PUBLICATIONS

3GPP TSG-RAN WG1#87, Reno, U.S.A., Nov. 14-18, 2016, On RS Design for Phase Tracking in NR, R1-1612860 (Year: 2016).*
(Continued)

*Primary Examiner* — Kouroush Mohebbi
(74) *Attorney, Agent, or Firm* — Lee, Hong, Degerman, Kang & Waimey

(57) ABSTRACT

Disclosed herein is a method and apparatus for a User Equipment to perform a phase tracking in a wireless communication system. According to the present invention, it may be provided the method and apparatus including receiving, from a base station, a Demodulation Reference Signal (DMRS) configured according to a specific pattern through a DMRS symbol; receiving, from the base station, a plurality of reference signals used for the phase tracking, wherein the plurality of reference signals is transmitted on a specific antenna port, and received through a specific resource region identical to at least one different reference signal transmitted on a different antenna port for the phase tracking; and performing the phase tracking based on at least one of the DMRS or the plurality of reference signals.

13 Claims, 25 Drawing Sheets

Related U.S. Application Data on Feb. 6, 2017, provisional application No. 62/476,734, filed on Mar. 25, 2017.

(56) References Cited

OTHER PUBLICATIONS

3GPP TSG-RA.N WG1 Meeting #87, Reno, USA, Nov. 14-18, 2016, WFon RS for Phase Tracking, R1-1613553, Agenda Item: 7.1.3.2 (Year: 2016).*
PCT International Application No. PCT/KR2017/011531, International Search Report dated Mar. 2, 2018, 4 pages.
Nokia, et al., "On RS Design for Phase Tracking in NR", 3GPP TSG RAN WG1 Meeting #87, R1-1612860, Nov. 2016, 14 pages.
Huawei, et al., "WF on RS for Phase Tracking", 3GPP TSG RAN WG1 Meeting #87, R1-1613553, Nov. 2016, 5 pages.
LG Electronics, "Reference Signal for Frequency offset and Phase Tracking", 3GPP TSG RAN WG1 Meeting #87, R1-1611809, Nov. 2016, 9 pages.
Ericsson, "On phase tracking in DFT-S-OFDM waveform", 3GPP TSG RAN WG1 Meeting #87, R1-1612338, Nov. 2016, 4 pages.
Huawei, HiSilicon, "Further details for PT-RS design," 3GPP TSG-RAN WG1, R1-1700073, Jan. 2017, 5 pages.
ZTE, "Discussion on RS for phase tracking," 3GPP TSG-RAN WG1, R1-1700138, Jan. 2017, 11 pages.
European Patent Office Application Serial No. 17895255.2, Search Report dated Oct. 30, 2020, 11 pages.

* cited by examiner

FIG. 5
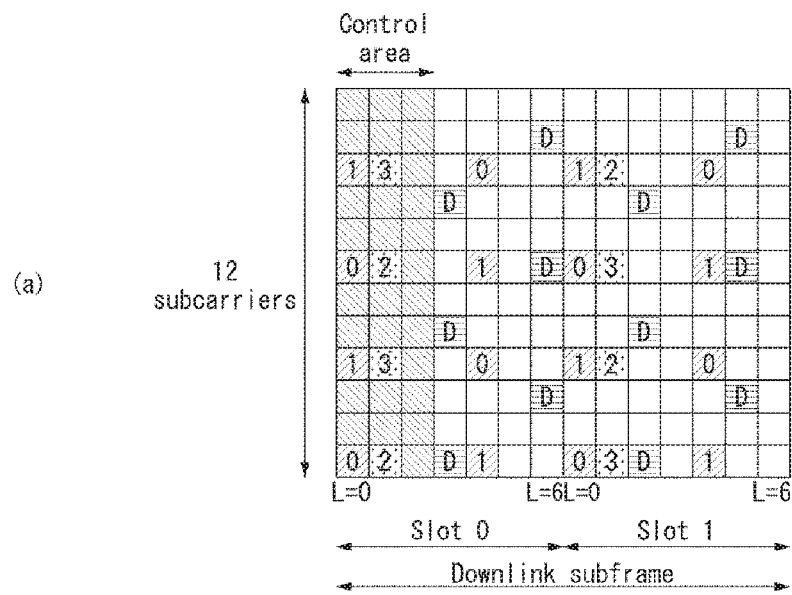
(a)
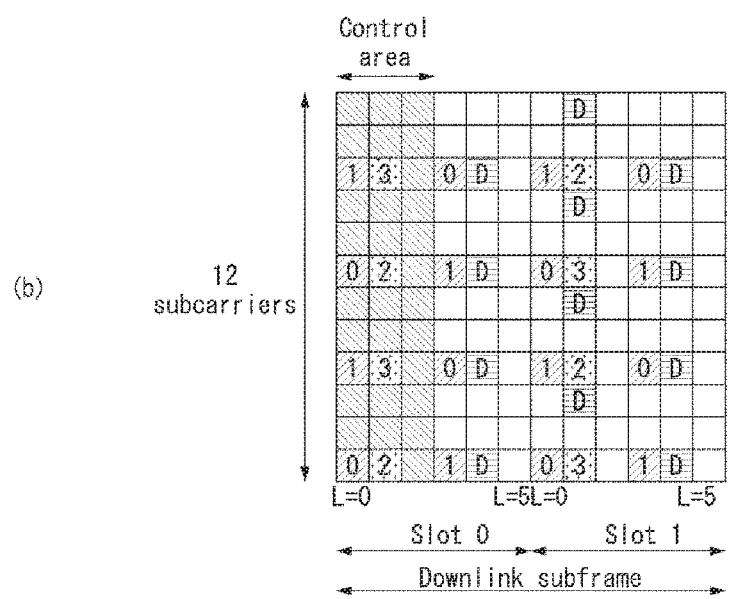
(b)

$P_0, P_1$: precoding vector for ABF
$H_0, H_1, H_2, H_3$: channel coefficient
$e^{j\phi_{rxp}(l)}$: phase noise of l-th sample @p-th RX antenna port $$\Phi_{rxp}(m) = \frac{1}{L}\sum_{l=0}^{L-1} e^{j\phi_{rxp}(l)}$$

$\Phi_{rxp}(m)$ : Common phase error of the $m^{th}$ OFDM symbol in the $P^{th}$ RX antenna port
L: Number of samples per OFDM symbol
$r_{txp}(m)$ : Number of samples per OFDM symbol $e^{j\phi_{txp}(l)}$ : Phase noise for the $l^{th}$ sample in the $p^{th}$ TX antenna port
$e^{j\phi_{txp}(l)} \neq e^{j\phi_{tx\bar{p}}(l)}$ $$\Phi_{tx\bar{p},rxp}(m) = \frac{1}{L}\sum_{l=0}^{L-1}\left(e^{j(\phi_{tx\bar{p}}(l)+\phi_{rxp}(l))}\right)$$

$\Phi_{tx\bar{p},rxp}(m)$ : Common phase error of the $m^{th}$ OFDM symbol in the $p^{th}$ RX antenna port in which a phase noise from TX antenna port

METHOD FOR TRACKING PHASE NOISE IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2017/011531, filed on Oct. 18, 2017, which claims the benefit of U.S. Provisional Application No. 62/454,059, filed on Feb. 3, 2017, 62/455,369, filed on Feb. 6, 2017, and 62/476,734, filed on Mar. 25, 2017, the contents of which are hereby incorporated by reference herein in their entirety.

TECHNICAL FIELD

The present invention relates to a wireless communication system and, more particularly, to a method for generating and transmitting a signal for tracking a phase noise in a wireless communication system and an apparatus therefor.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to provide a method and apparatus for tracking a phase noise.

In addition, an object of the present invention is to provide a method and apparatus for tracking CPE (Common Phase Error)/CFO (Carrier Frequency Offset) value using a Phase Tacking Reference Signal.

In addition, an object of the present invention is to provide a method and apparatus for performing a phase tracking on a plurality of antenna ports using one PTRS.

In addition, an object of the present invention is to provide a method and apparatus in which a PTRS of each layer is transmitted using an identical resource region.

In addition, an object of the present invention is to provide a method and apparatus for configuring PTRSs of a plurality of terminals in a time domain and a frequency domain.

Technical objects to be achieved in the present invention are not limited to the above-described technical objects, and other technical objects not described above may be evidently understood by a person having ordinary skill in the art to which the present invention pertains from the following description.

Technical Solution

Particularly, a method for a phase tracking of a User Equipment according to an embodiment of the present invention includes receiving, from a base station, a Demodulation Reference Signal (DMRS) configured according to a specific pattern through a DMRS symbol; receiving, from the base station, a plurality of reference signals used for the phase tracking, wherein the plurality of reference signals is transmitted on a specific antenna port, and received through a specific resource region identical to at least one different reference signal transmitted on a different antenna port for the phase tracking; and performing the phase tracking based on at least one of the DMRS or the plurality of reference signals.

In addition, in the present invention, the DMRS and the plurality of reference signals are precoded through an identical precoder.

In addition, in the present invention, the plurality of reference signals is identical to the symbols in the specific resource region, respectively.

In addition, in the present invention, the plurality of reference signals is identical to the at least one different reference signal.

In addition, in the present invention, the DMRS and the plurality of reference signals are generated through identical Orthogonal Cover Code or identical Discrete Fourier Transform (DFT) code.

In addition, in the present invention, the specific resource region is configured on a frequency tone identical to the DMRS in a frequency domain.

In addition, the present invention further includes generating an effective channel of each symbol using the DMRS, wherein the step of performing the phase tracking includes: tracking the generated effective channel of each symbol; and tracking a phase difference between symbols using one of the DMRS and the plurality of reference signals.

In addition, in the present invention, the plurality of reference signals is configured according to a specific pattern in a time domain.

In addition, the present invention further includes receiving, from the base station, pattern information representing the specific pattern; wherein the specific pattern is a time pattern of which overhead is a greatest between a first time pattern of the User Equipment and a second time pattern of different User Equipments scheduled with the User Equipment.

In addition, the present invention further includes receiving, from the base station, scheduling information of different User Equipments scheduled with the User Equipment, wherein the specific pattern is a time pattern of the User Equipment, and wherein the reference signal is transmitted in a resource region in which an interference with the different User Equipments is not occurred among the specific resource region based on the scheduling information.

In addition, the present invention provides a User Equipment including a communication unit for transmitting and receiving a radio signal with an exterior; and a processor functionally connected to the communication unit, wherein the processor is configured to: receive, from a base station, a Demodulation Reference Signal (DMRS) configured according to a specific pattern through a DMRS symbol; receive, from the base station, a plurality of reference signals used for the phase tracking, wherein the plurality of reference signals is transmitted on a specific antenna port, and received through a specific resource region identical to at least one different reference signal transmitted on a different antenna port for the phase tracking; and performing the phase tracking based on at least one of the DMRS or the plurality of reference signals.

Advantageous Effects

According to the present invention, there is an effect that a phase noise may be compensated by tracking CPE (Common Phase Error) and CFO (Carrier Frequency Offset) values through a PTRS.

In addition, according to the present invention, a phase tracking is performed on a plurality of antenna ports using a single PTRS, and overhead of a reference signal may be reduced, and accordingly, a transparent operation may be performed.

In addition, according to the present invention, a PTRS of each layer is transmitted in an identical resource region, and overhead of a reference signal may be reduced, and accordingly, a transparent operation may be performed.

In addition, according to the present invention, a PTRS is disposed on a time domain and a frequency domain according to a terminal, interference due to a PTRS transmission between terminals may be reduced, and accordingly, a PTRS may be disposed in a transparent structure.

The effects which may be obtained in the present invention are not limited to the above-described effects, and other technical effects not described above may be evidently understood by a person having ordinary skill in the art to which the present invention pertains from the following description.

DESCRIPTION OF DRAWINGS

The accompanying drawings included as a part of the detailed description to help an understanding of the present invention provide the embodiments for the present invention and describe the technical features of the present invention together with the detailed description.

FIG. 5 illustrates reference signal patterns mapped to downlink resource block pairs in a wireless communication system to which the present invention may be applied.

MODE FOR INVENTION

Figure 1:
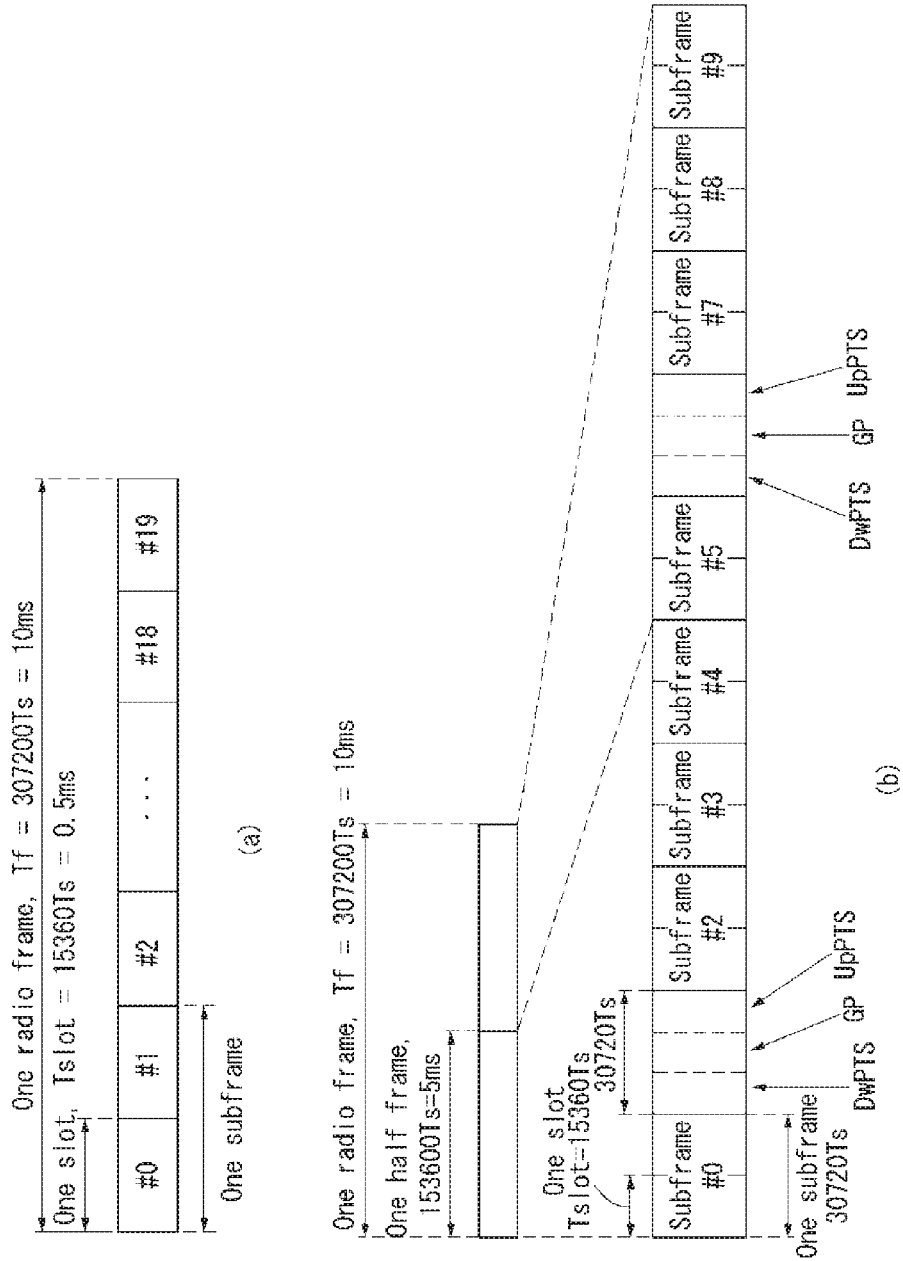
FIG. 1 shows the structure of a radio frame in a wireless communication system to which an embodiment of the present invention may be applied.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention.

However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |

TABLE 1-continued

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of T_slot=15360*T_s=0.5 ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half-frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| | Normal cyclic prefix in downlink | | | Extended cyclic prefix in downlink | | |
|---|---|---|---|---|---|---|
| | | UpPTS | | | UpPTS | |
| | | Normal | | | | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | | |
| 8 | $24144 \cdot T_s$ | | | — | | |

The structure of a radio subframe according to the example of FIG. 1 is just an example, and the number of subcarriers included in a radio frame, the number of slots included in a subframe and the number of OFDM symbols included in a slot may be changed in various manners.

Figure 2:
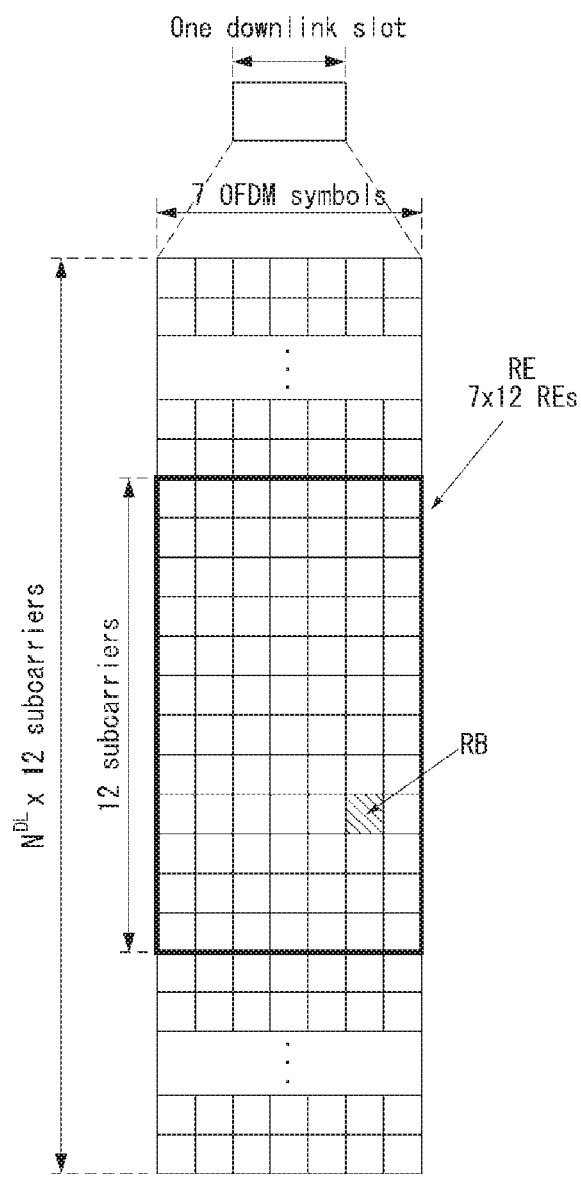
FIG. 2 is a diagram illustrating a resource grid for one downlink slot in a wireless communication system to which an embodiment of the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

Figure 3:
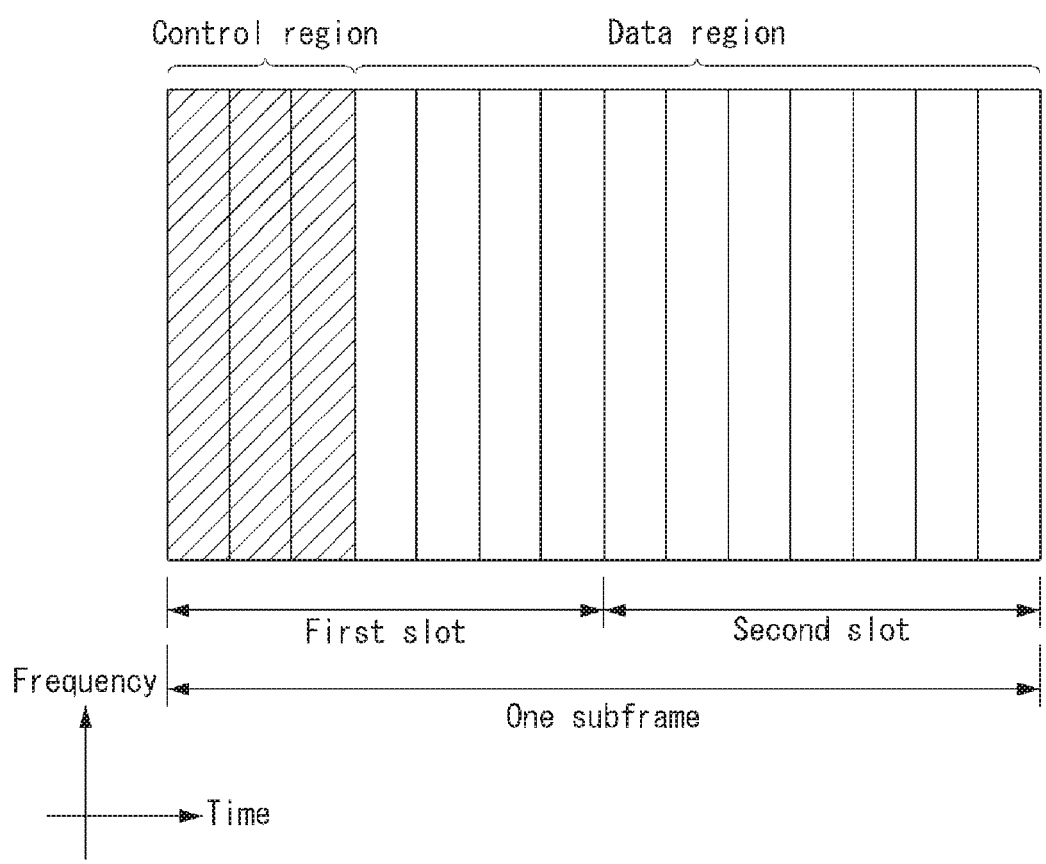
FIG. 3 shows the structure of a downlink subframe in a wireless communication system to which an embodiment of the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (this is called a Radio Network Temporary Identifier (RNTI)) is masked to the CRC depending on the owner or use of a PDCCH. In the case that the PDCCH is a PDCCH for specific UE, an identifier unique to the UE, for example, a Cell-RNTI (C-RNTI) may be masked to the CRC. Or, in the case that the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

Figure 4:
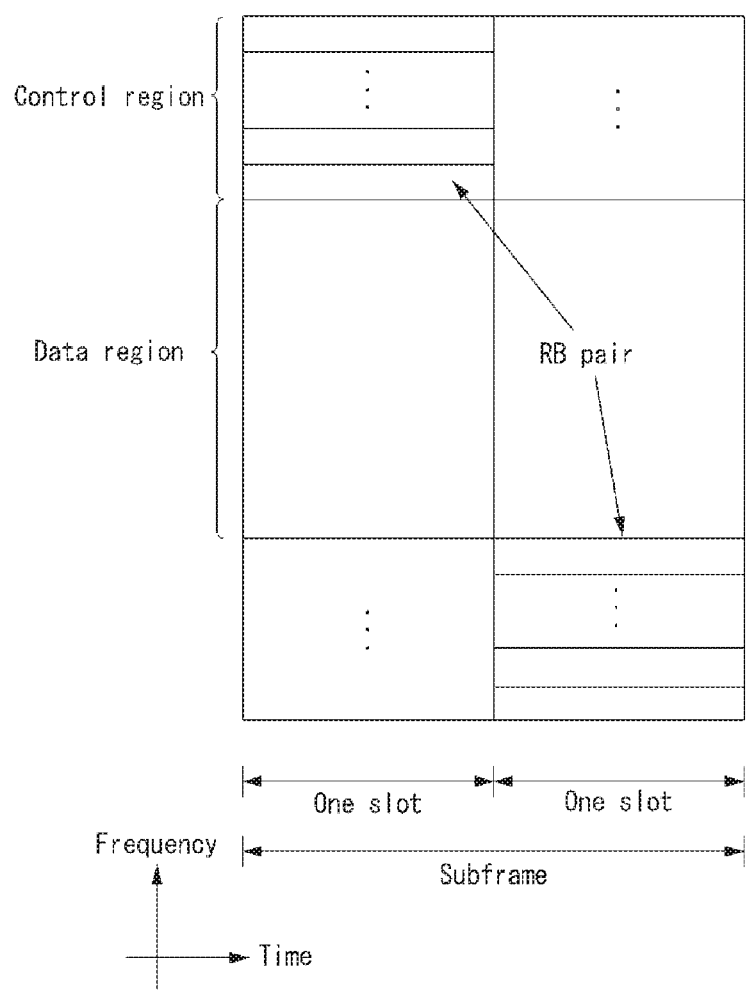
FIG. 4 shows the structure of an uplink subframe in a wireless communication system to which an embodiment of the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

FIG. 5 illustrates reference signal patterns mapped to downlink resource block pairs in a wireless communication system to which the present invention may be applied.

Referring to FIG. 5, a downlink resource block pair, that is, a unit in which a reference signal is mapped, may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 5a) and has a length of 12 OFDM symbols in the case of an extended cyclic prefix (CP) (FIG. 5b). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

A CRS is described in more detail below. The CRS is a reference signal which is used to estimate the channel of a physical antenna and may be received by all UEs located within a cell in common. The CRS is distributed to a full frequency bandwidth. That is, the CRS is cell-specific signal and is transmitted every subframe in a wideband. Furthermore, the CRS may be used for channel quality information (CSI) and data demodulation.

A CRS is defined in various formats depending on an antenna array on the transmitting side (eNB). In the 3GPP LTE system (e.g., Release-8), an RS for a maximum four antenna ports is transmitted depending on the number of transmission antennas of an eNB. The side from which a downlink signal is transmitted has three types of antenna arrays, such as a single transmission antenna, two transmission antennas and four transmission antennas. For example, in the case that the number of transmission antennas of an eNB is two, CRSs for a No. 0 antenna port and a No. 1 antenna port are transmitted. In the case that the number of transmission antennas of an eNB is four, CRSs for No. 0 to No. 3 antenna ports are transmitted.

In the case that an eNB uses a single transmission antenna, reference signals for a single antenna port are arrayed.

In the case that an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, in the case that an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

In the case that a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

The rule of mapping a CRS to a resource block is defined as below.

$$k = 6m + (v + v_{shift}) \bmod 6 \quad \text{[Equation 1]}$$

$$l = \begin{cases} 0, N_{symb}^{DL} - 3 & \text{if } p \in \{0,1\} \\ 1 & \text{if } p \in \{2,3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 1, k and l represent the subcarrier index and the symbol index, respectively and p represents the antenna port. $N_{symb}^{DL}$ represents the number of OFDM symbols in one downlink slot and $N_{RB}^{DL}$ represents the number of radio resources allocated to the downlink, ns represents a slot index and, $N_{ID}^{cell}$ represents a cell ID. The mod represents an modulo operation. The position of the reference signal varies depending on the $v_{shift}$ value in the frequency domain. Since $v_{shift}$ is subordinated to the cell ID, the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific UE in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 2 shows the case of the normal CP and Equation 3 shows the case of the extended CP.

$$k = (k') \bmod N_{sc}^{RB} + N_{sc}^{RB} \cdot n_{PRB} \quad \text{[Equation 2]}$$
$$k' = \begin{cases} 4m' + v_{shift} & \text{if } l \in \{2,3\} \\ 4m' + (2 + v_{shift}) \bmod 4 & \text{if } l \in \{5,6\} \end{cases}$$
$$l = \begin{cases} 3 & l' = 0 \\ 6 & l' = 1 \\ 2 & l' = 2 \\ 5 & l' = 3 \end{cases}$$
$$l' = \begin{cases} 0,1 & \text{if } n_s \bmod 2 = 0 \\ 2,3 & \text{if } n_s \bmod 2 = 1 \end{cases}$$
$$m' = 0, 1, \ldots, 3N_{RB}^{PDSCH} - 1$$
$$v_{shift} = N_{ID}^{cell} \bmod 3$$

$$k = (k') \bmod N_{sc}^{RB} + N_{sc}^{RB} \cdot n_{PRB} \quad \text{[Equation 3]}$$
$$k' = \begin{cases} 3m' + v_{shift} & \text{if } l = 4 \\ 3m' + (2 + v_{shift}) \bmod 3 & \text{if } l = 1 \end{cases}$$
$$l = \begin{cases} 4 & l' \in \{0,2\} \\ 1 & l' = 1 \end{cases}$$
$$l' = \begin{cases} 0 & \text{if } n_s \bmod 2 = 0 \\ 1,2 & \text{if } n_s \bmod 2 = 1 \end{cases}$$
$$m' = 0, 1, \ldots, 4N_{RB}^{PDSCH} - 1$$
$$v_{shift} = N_{ID}^{cell} \bmod 3$$

In Equations 3 and 4, k and 1 represent the subcarrier index and the symbol index, respectively and p represents the antenna port. $N_{sc}^{RB}$ represents the size of the resource block in the frequency domain and is expressed as the number of subcarriers. $n_{PRB}$ represents the number of physical resource blocks. $N_{RB}^{PDSCH}$ represents a frequency band of the resource block for the PDSCH transmission. ns represents the slot index and $N_{ID}^{cell}$ represents the cell ID. The mod represents the modulo operation. The position of the reference signal varies depending on the value in the frequency domain. Since $v_{shift}$ is subordinated to the cell ID, the position of the reference signal has various frequency shift values according to the cell.

In an LTE-A system of an evolved form of the LTE system, the design needs to be performed to support a maximum of 8 transmitting antennas in the downlink of a base station. Accordingly, an RS for the maximum of 8 transmission antennas must be also supported. In the LTE system, only a downlink RS for a maximum of 4 antenna ports has been defined. In the case that a base station has 4 or a maximum of 8 downlink transmission antennas in the LTE-A system, an RS for such antenna ports needs to be additionally defined and designed. Regarding the RS for a maximum of 8 transmission antenna ports, both the above-described RS for channel measurement and the above-described RS for data demodulation must be designed.

One of important considerations in designing an LTE-A system is backward compatibility. That is, an LTE user equipment must well operate in the LTE-A system without any difficulty, and the system must support this. From a viewpoint of RS transmission, an RS for a maximum of 8 transmission antenna ports must be additionally defined in the time-frequency domain in which a CRS defined in LTE is transmitted every subframe in a full band. In the LTE-A system, if an RS pattern for the maximum of 8 transmission antenna is added to a full band every subframe using a method, such as that for the CRS of the existing LTE, RS overhead excessively increases.

Accordingly, an RS newly designed in the LTE-A system may be basically divided into two types, that is, an RS for channel measurement for the selection of an MCS, PMI, and the like (channel state information-RS, channel state indication-RS (CSI-RS), etc.) and a data demodulation (DM)-RS for data demodulation transmitted in 8 transmission antennas.

The existing CRS is used for channel measurement, the measurement of handover, etc. and for data demodulation, whereas the CSI-RS for channel measurement is designed for a channel measurement-oriented purpose. Furthermore, the CSI-RS for channel measurement may also be used for the measurement of handover. Since the CSI-RS is used to obtain information on the channel state only, it does not need to be transmitted every subframe unlike the CRS. In order to reduce overhead of the CSI-RS, the CSI-RS is intermittently transmitted on the time axis.

A DM-RS is dedicatedly transmitted to a UE scheduled in a corresponding time-frequency domain for data demodulation. That is, the DM-RS of a specific UE is transmitted only in a region in which a corresponding UE is scheduled, that is, only in a time-frequency domain in which data is received.

In the LTE-A system, an eNB has to transmit a CSI-RS for all antenna ports. To transmit a CSI-RS for a maximum of 8 transmission antenna ports every subframe has a disadvantage in that overhead is too great. Accordingly, the CSI-RS is not transmitted every subframe, but needs to be intermittently transmitted in the time axis in order to reduce corresponding overhead. That is, the CSI-RS may be periodically transmitted in the period of a multiple of one subframe or may be transmitted in a specific transmission pattern. In this case, the period or pattern in which the CSI-RS is transmitted may be configured by the eNB.

In order to measure a CSI-RS, a UE must be aware of the transmission subframe index of a CSI-RS for each CSI-RS antenna port of a cell to which the UE belongs, a CSI-RS resource element (RE) time-frequency position within the transmission subframe, and information on a CSI-RS sequence.

In the LTE-A system, an eNB needs to transmit a CSI-RS with respect to each of a maximum of 8 antenna ports. Resources used for the CSI-RS transmission of different antenna ports need to be orthogonal. When one eNB transmits CSI-RSs for different antenna ports, it may orthogonally allocate resources according to the FDM/TDM scheme by mapping the CSI-RSs for the respective antenna ports to different REs. Alternatively, the eNB may transmit the CSI-RSs for different antenna ports according to a CDM scheme for mapping the CSI-RSs to orthogonal codes.

When an eNB notifies its own cell UE of information on a CSI-RS, first, it has to notify the UE of information on a time-frequency to which a CSI-RS for each antenna port is mapped. Specifically, the information includes subframe numbers in which a CSI-RS is transmitted or the period in which a CSI-RS is transmitted, a subframe offset in which a CSI-RS is transmitted, an OFDM symbol number in which a CSI-RS RE of a specific antenna is transmitted, frequency spacing, an offset or shift value of an RE in the frequency axis, and so on.

Phase Tracking Reference Signal (PTRS)

Hereinafter, a PTRS is described in detail.

A PTRS may be called a phase (noise) compensation reference signal (PCRS) or a phase noise reference signal (PDNS).

DL PTRS Procedure

When a UE detects an xPDCCH having the DCI format B1 or B2 in its intended subframe n, the UE receives a DL PTRS in a PTRS antenna port indicated in DCI in the corresponding subframe.

UL PTRS Procedure

When a UE detects an xPDCCH having the DCI format A1 or A2 in its intended subframe n, the UE transmits an UL PTRS in a subframe n+4+m+1 using one or two PTRS antenna ports identical with an allocated DM-RS antenna port indicated in DCI other than the following conditions (condition 1 and condition 2).

Condition 1: if the dual PTRS field of detected DCI is set to '1' and the number of DM-RS ports allocated to an xPUSCH is '1', a UE transmits an UL PTRS in a subframe n+4+m+1 using the same PTRS port as an additional PTRS antenna port having the same subcarrier position as an allocated DM-RS antenna port and specific PTRS antenna port indicated in DCI.

Condition 2: a relative transmission power ratio between a PTRS and an xPUSCH is determined by a transmission method defined by Table 3.

Table 3 shows an example of the relative transmit power ratio of a PTRS and an xPUSCH on a given layer.

TABLE 3

| Transmission Scheme | Relative Transmit Power Ratio |
| --- | --- |
| Single-layer transmission | 3 dB |
| Two-layer transmission | 6 dB |

Hereinafter, a PTRS is described more specifically.

A PTRS associated with an xPUSCH is (1) transmitted in an antenna port(p) $p \in \{40,41,42,43\}$, (2) a valid criterion for phase noise compensation only when the PTRS is present and xPUSCH transmission is related to a corresponding antenna port, and (3) transmitted on physical resource blocks and symbols to which a corresponding xPUSCH is mapped.

Sequence Generation

A reference signal sequence r(m) is defined like Equation 4 with respect to a given antenna port, that is, $p \in \{40,41,42,43\}$.

$$r(m) = \frac{1}{\sqrt{2}}(1 - 2 \cdot c(2m)) + j\frac{1}{\sqrt{2}}(1 - 2 \cdot c(2m+1)),$$ [Equation 4]

$$m = 0, 1, \ldots, \lfloor N_{RB}^{max,UL}/4 \rfloor - 1$$

A pseudo-random sequence c(i) is defined by a Gold sequence of length-31, and a pseudo-random sequence generator is initialized at the start of each subframe as in Equation 5.

$$c_{init} = \lfloor n_s/2 \rfloor + 1) \cdot (2n_{ID}^{(nSCID)} + 1) \cdot 2^{16} + n_{SCID}$$ [Equation 5]

$n_{ID}^{(i)}$ quantity (i=0,1) is given as below.

$n_{ID}^{(i)} = n_{ID}^{(cell)}$, if any value is not given by a higher layer with respect to $n_{ID}^{(i)} = n_{ID}^{(PTRS,i)}$, if a value is given by a higher layer with respect to $n_{ID}^{(PTRS,i)}$.

The value of $n_{SCID}$ is 0 unless specified otherwise. For xPUSCH transmission, $n_{SCID}$ is given by a DCI format associated with xPUSCH transmission.

Mapping to Resource Elements

In a physical resource block having a frequency domain index n_PRB allocated for corresponding xPUSCH transmission with respect to an antenna port $p \in \{40,41,42,43\}$ part of a reference signal sequence r(m) is mapped to a complex-value modulation symbol ak,lp for corresponding xPUSCH symbols in a subframe according to $a_{k,l}^{(p)} = r(k'')$.

A resource element (k, l') for one subframe is given like Equation 6 with respect to the start physical resource block index $n_{PRB}^{xPUSCH}$ of xPUSCH physical resource allocation and the number of xPUSCH physical resource blocks $n_{PRB}^{xPUSCH}$.

$$k = N_{sc}^{RB} \cdot (n_{PRB}^{xPUSCH} + k'' \cdot 4) + k'$$ [Equation 6]

$$k' = \begin{cases} 16 & p \in \{40, 41\} \\ 31 & p \in \{42, 43\} \end{cases}$$

$$k'' = \lfloor m'/4 \rfloor$$

$$l' = \begin{cases} \left\{ l' \mid l' \in \{3, \ldots, l_{iant}^{xPUSCH}\} \text{ and } l' \text{ is an odd number} \right\}, & p \in \left\{ \begin{array}{c} 40 + m'', \\ 42 + m'' \end{array} \right\} \\ \left\{ l' \mid l' \in \{3, \ldots, l_{last}^{xPUSCH}\} \text{ and } l' \text{ is an even number} \right\}, & p \in \left\{ \begin{array}{c} 41 - m'', \\ 43 - m'' \end{array} \right\} \end{cases}$$

$$m' = 0, 1, 2, \ldots, N_{PRB}^{xPUSCH} - 1$$

$$m'' = \lfloor m'/4 \rfloor \bmod 2$$

In Equation 6, m=0, 1, 2, . . . , $n_{PRB}^{xPUSCH}$, 1 indicates a symbol index within one subframe, and $l'_{last}^{xPUSCH}$ indicates the last symbol index of an xPUSCH for a given subframe.

A resource element (k, l') used for the transmission of a UE-specific PTRS from one UE on a given antenna port in a set S is not used for the transmission of an xPUSCH on a given antenna port in the same subframe.

In this case, S is {40}, {41}, {42}.

Carrier Frequency Offset (CFO) effect

A baseband signal transmitted by a transmitter (e.g., base station) shifts to a pass band due to a carrier frequency occurred in the oscillator. The signal transmitted through the carrier frequency is converted into a baseband signal by the same carrier frequency in a receiver (e.g., UE).

In this case, the signal received by the receiver may include distortion related to a carrier.

As an example of such distortion, there may be a distortion phenomenon occurring due to a difference between the carrier frequency of a transmitter and the carrier frequency of a receiver.

The reason why such a carrier frequency offset occurs is that oscillators used in the transmitter and the receiver are not the same or a Doppler frequency shift occurs due to a movement of a user equipment.

In this case, the Doppler frequency is proportional to the moving speed of the user equipment and the carrier frequency and is defined like Equation 7.

$$f_d = \frac{v \cdot f_c}{c}$$ [Equation 7]

In Equation 19, $f_c$, $f_d$, v and c sequentially indicate a carrier frequency, a Doppler frequency, the moving speed of a user equipment, and the speed of light.

Furthermore, a normalized carrier frequency offset c is defined like Equation 8.

$$\varepsilon = \frac{f_{offset}}{\Delta f} \quad \text{[Equation 8]}$$

In Equation 8, $f_{offset}, \Delta f, \varepsilon$ sequentially indicate a carrier frequency offset, a subcarrier spacing, and a normalized carrier frequency offset at a subcarrier spacing.

In the case that a carrier frequency offset is present, a received signal in the time domain is the results of the production of a transmitted signal and phase rotation. A received signal in the frequency domain is the results of a shift of a transmitted signal in the frequency domain.

In this case, inter-carrier-interference (ICI) occurs due to the influence of all other subcarrier(s).

That is, when a decimal multiple carrier frequency offset occurs, a received signal in the frequency domain is represented like Equation 9.

Equation 9 represents a received signal having a CFO in the frequency domain $$Y_l[k] = e^{j\pi\varepsilon(N-1)/N}\left\{\frac{\sin\pi\varepsilon}{N\sin(\pi\varepsilon/N)}\right\}H_l[k]X_l[k] + I_l[k] + Z[k] \quad \text{[Equation 9]}$$

In Equation 9, k, l, N, Y[•], X[•], H[•], I[•], Z[•] sequentially indicate a subcarrier index, a symbol index, an FFT size, a received signal, a transmitted signal, a frequency response, and ICI attributable to a CFO, and white noise.

As defined in Equation 9, it may be seen that if a carrier frequency offset is present, the amplitude and phase of a $k^{th}$ subcarrier are distorted and interference attributable to a neighbor subcarrier occurs.

In this case, in the case that a carrier frequency offset is present, interference attributable to a neighbor subcarrier may be given like Equation 10.

Equation 10 represents ICI caused by a CFO $$I_l[k] = e^{j\pi\varepsilon(N-1)/N} \quad \text{[Equation 10]}$$
$$\sum_{\substack{m=0 \\ m \neq k}}^{N-1} H[m]X_l[m]\left\{\frac{\sin\pi\varepsilon}{N\sin(\pi(m-k+\varepsilon)/N)}\right\}e^{-j\pi(m-k)/N}$$

Phase Noise Effect

As described above, a baseband signal transmitted by a transmitter shifts to a pass band by a carrier frequency generated from an oscillator. The signal transmitted through the carrier frequency is converted into a baseband signal by the same carrier frequency in a receiver.

In this case, the signal received by the receiver may include distortion related to a carrier.

An example of such a distorted phenomenon may include phase noise occurring because the characteristics of oscillators used in a transmitter and a receiver are not stable.

Such phase noise means that the frequency varies over time around a carrier frequency.

The phase noise is modeled as a Wiener process, that is, a random process having an average of 0, and affects an OFDM system.

Figure 6:
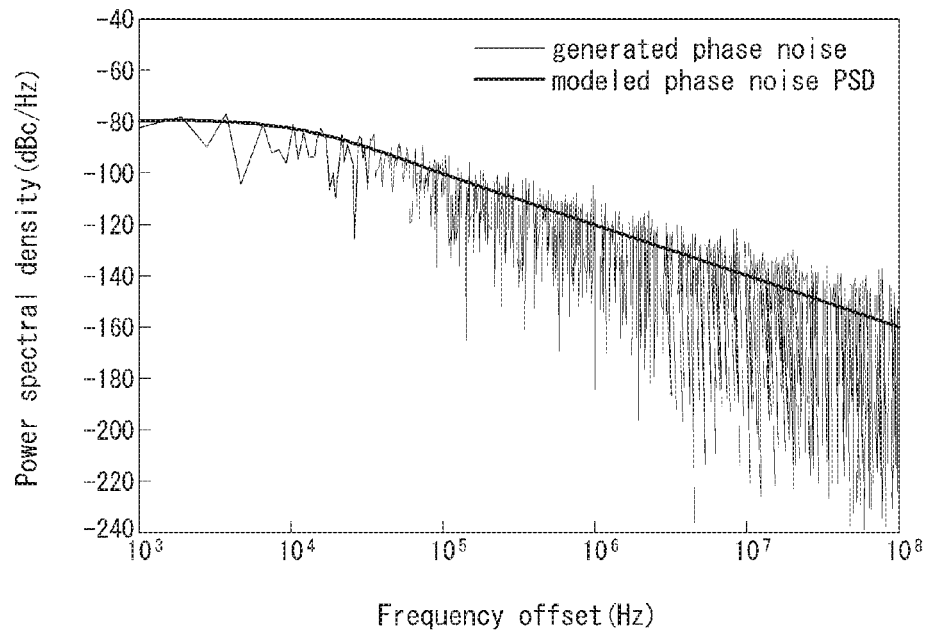
FIG. 6 illustrates an example of a power spectral density of an oscillator.

In addition, as shown in FIG. 6 below, the phase noise has a tendency that as the frequency of carrier increases, the influence increases.

The phase noise has a tendency in which the characteristic of an oscillator is determined based on the same power spectral density.

FIG. 6 illustrates an example of a power spectral density of an oscillator.

As such, a distortion phenomenon of a signal resulting from the phase noise as described above is represented as a common phase error (CPE) and an inter-carrier interference (ICI) in an OFDM system.

The following Equation 11 indicates an influence of the phase noise on a received signal of the OFDM system. That is, the following Equation 11 indicates a received signal with the phase noise in the frequency domain.

$$Y_l(k) = X_l(k)H_l(k)I_l(0) + ICI_l(k) + Z_l(k) \quad \text{[Equation 11]}$$

$$\text{where } ICI_l(k) = \sum_{m=0, m \neq k}^{N-1} X_l(m)H_l(m)I_l(m-k)$$

$$\text{and } I_l(p) = \frac{1}{N}\sum_{n=0}^{N-1} e^{j[\frac{2\pi pn}{N} + \phi_l(n)]}$$

In the above Equation 11, k, l, N, Y(•), X(•), H(•), I(•), ICI(•), Z(•), φ(•) denotes a subcarrier index, a symbol index, a FFT size, a received signal, a transmitted signal, a frequency response, a common phase error resulting from the phase noise, inter-carrier interference resulting from the phase noise, a white noise, phase rotation resulting from the phase noise, respectively.

Due to the property of an oscillator, a greater phase noise occurs in a high frequency band.

Such a phase noise causes a distortion in a reception signal in a receiver and acts as a factor that degrades a demodulation performance of the reception signal.

Therefore, it is required a method for alleviating an influence of such a phase noise in a high frequency band.

One of a method of reducing or alleviating an influence of a phase noise is to track and compensate a distortion of a reception signal in a receiver (reception device, UE, etc.) using a reference signal (RS).

Here, the existing reference signal such as Cell-specific Reference Signal (CRS) or Demodulation Reference Signal (DM-RS) of the LTE system is designed to be orthogonal depending on a transport port.

Because an effective channel between a transmitter and a receiver is different, this is designed to remove interference between different ports with each other when performing a channel estimation for different transport ports with each other.

In addition, a phase noise may be identically or differently defined depending on a port according to an implementation scheme of hardware.

Further, depending on whether the phase noise is defined identically or differently for each port, the definition for a PTRS may be changed.

For example, in the case of assuming that the phase noise is identical for each port, a receiver may use the same PTRS for all ports and track a distortion for a reception signal.

However, in the case of assuming that the phase noise is different for each port, a reference signal which is orthogonal for each port needs to be defined.

Further, even in the case of assuming that the same phase noise among multiple ports in the same eNB or the same UE, for a transmission through a plurality of eNBs (or multi-eNB transmission) or a transmission through a plurality of UEs (or multi-UE transmission), an influence among ports may be changed.

Accordingly, in the case that the multi-eNB transmission or the multi-UE transmission is allowed or defined, at least 2 ports of independent PTRSs needs to be defined.

The contents described above is summarized as below.

(1) In the case of assuming the same phase noise for different ports with each other, a receiver may estimate a distortion of a reception signal for different ports with each other by using the same PTRS, and through this, may compensate the reception signal.

(2) In the case of assuming different phase noises for different ports with each other, in order for a receiver to estimate and compensate a distortion of a reception signal, an independent PTRS needs to be defined for each port. Accordingly, the receiver may estimate and compensate a distortion of the reception signal using the PTRS defined for each port.

According to (1) and (2) described above, for an efficient RS design, the following methods (method 1 and method 2) may be considered.

(Method 1)

In method 1, according to (1) described above, overhead of an RS is reduced by defining the same PTRS for different ports with each other.

(Method 2)

In method 2, according to (2) described above, a distortion of reception signal for each port is estimated and compensated by defining independent PTRS for different ports with each other.

Hereinafter, using the RS design method above (method 1 and method 2), considering a phase noise which may be identical or different for each port, it is described a method of defining a DM-RS and a PTRS for tracking the phase noise.

First, with reference to Table 4 below, it is described cases for designing a PTRS.

That is, Table 4 represents examples of a PTRS structure which can be designed or defined according to whether an influence of a phase noise is considered at a transmitter or a receiver.

Hereinafter, each of the cases (cases 1 to 10) represented in Table 4 is described in more detail with reference to the associated drawing and equation.

Case 1: Single-eNB

Case 1 assumes a downlink case of a single-eNB in which a phase noise at a transmitter (e.g., eNB) is not considered.

Figure 7:
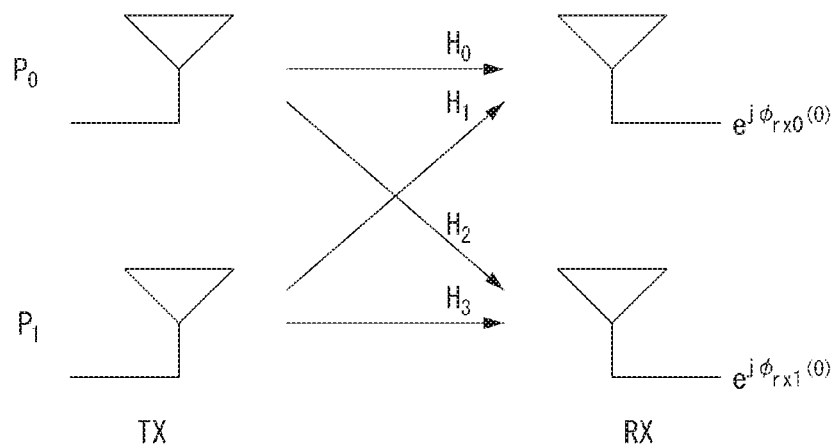
FIG. 7 is a diagram illustrating an example of an antenna configuration to which the method proposed in the present specification may be applied.

FIG. 7 is a diagram illustrating an example of an antenna configuration to which the method proposed in the present specification may be applied.

In FIG. 7, $P_0$ and $P_1$ represent precoding vectors for respective Adaptive Beamforming (ABF), H0, H1, H2 and H3 represents respective channel coefficients, and $e^{j\Theta_{rxp}(l)}$ represents a phase noise for the $l^{th}$ sample in the $p^{th}$ RX antenna port.

Figure 8:
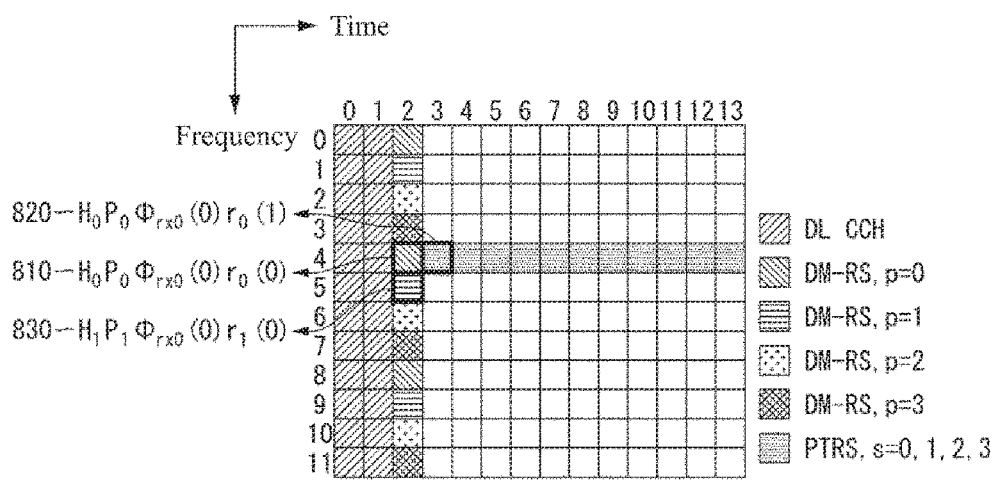
FIG. 8 is a diagram illustrating an example of a DM-RS structure and a PTRS structure.

FIG. 8 is a diagram illustrating an example of a DM-RS structure and a PTRS structure.

Particularly, FIG. 8 shows a structure that a DMRS for each port is transmitted in FDM scheme, and a PTRS is shared since a phase rotation for each DMRS port is the same.

Referring to FIG. 8, it is shown that the phase rotation tracked in the $0^{th}$ port may be identically applied to the $1^{st}$ port.

In FIG. 8, $\Phi_{rxp}(m)$ represents a common phase error of the $m^{th}$ OFDM symbol in the $p^{th}$ RX antenna port, L represents the number of samples per OFDM symbol, and $r_{rxp}(m)$ represents a reference signal of the $m^{th}$ OFDM symbol from the $p^{th}$ TX antenna port.

The meaning of the symbol may be applied identically to the description to be described below.

In addition, in FIG. 8, 810 denotes a signal received in a receiver at (2, 4) and means a signal to which a common phase noise is reflected on a DM-RS transmitted in the 0th port.

In addition, 820 denotes a PTRS signal received at (3, 4), and 830 denotes a DM-RS signal received at (2, 5).

Here, (l, k) represents (symbol index, subcarrier index).

In FIG. 8, for the convenience of description, m has a starting point of the smallest index among the OFDM symbols on which a DM-RS is located.

That is, in FIG. 8, in the case that a DM-RS is located at the third OFDM symbol (l=2), m has 0 value (m=0) at the third OFDM symbol.

TABLE 4

| | Phase noise characteristic | | # of TX points | # of seperated PTRSs |
|---|---|---|---|---|
| Downlink | Not considering phase noise @eNB | | Case 1: Single-eNB | 1 |
| | | | Case 2: Multi-eNB | |
| | Considering phase noise @eNB | Different phase noise b/w each layer | Case 3: Single-eNB | # of maximum layers |
| | | | Case 4: Multi-eNB | # of maximum layers * # of maximum eNBs |
| | | Same phase noise regarding overall layers | Case 5: Single-eNB | 1 |
| | | | Case 6: Multi-eNB | # of maximum eNBs |
| Uplink | Considering phase noise @UE | Different phase noise b/w each layer | Case 7: Single UE | # of maximum layers |
| | | | Case 8: Multi UE | # of maximum layers * # of maximum UEs |
| | | Same phase noise regarding overall layers | Case 9: Single UE | 1 |
| | | | Case 10: Multi UE | # of maximum UEs |

In addition, for the convenience of description, for a reception signal, an influence of a noise and inter-carrier interference (ICI) is excluded.

Furthermore, in FIG. 8, a phase rotation tracking value using a PTRS of port 0 is identical for all ports (p=0, 1, 2, 3).

This may be checked by Equation 12 below.

$$H_0 P_0 \Phi_{rx0}(1) \cdot (H_0 P_0 \Phi_{rx0}(0))^* = |H_0 P_0|^2 \Phi_{rx0}(1) \cdot \Phi_{rx0}(0)^* \rightarrow \text{angle}(\Phi_{rx0}(1)) - \text{angle}(\Phi_{rx0}(0))$$ [Equation 12]

Figure 9:
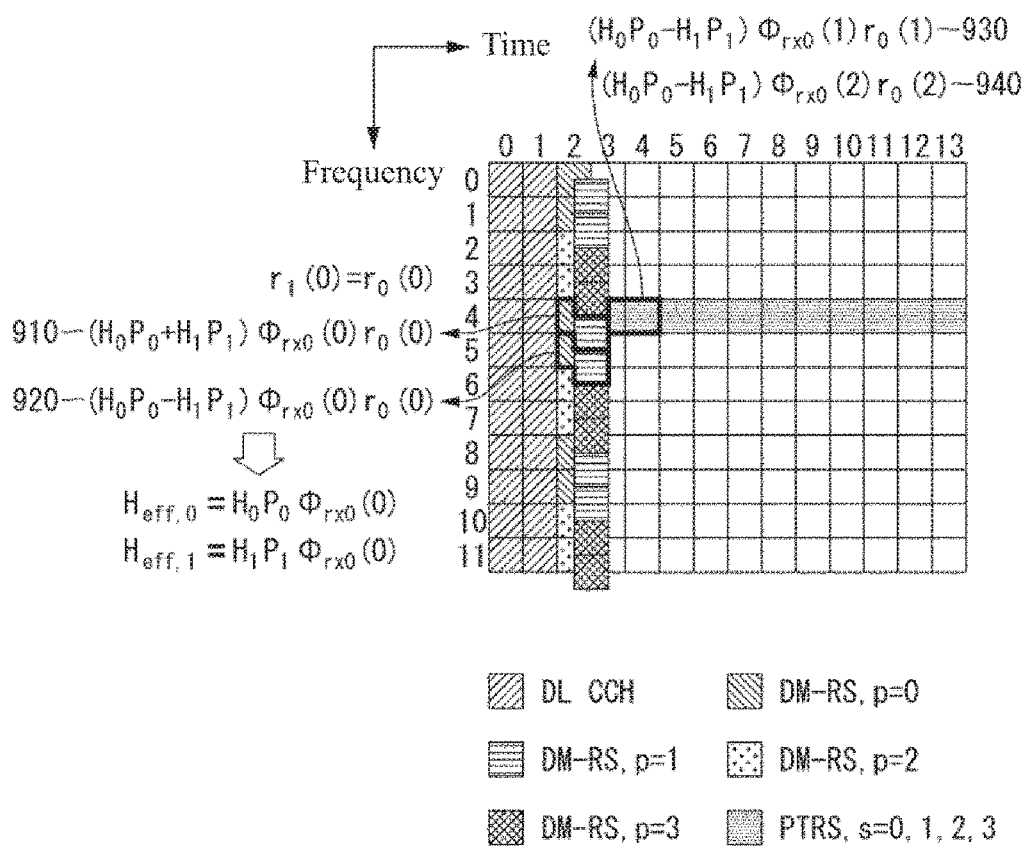
FIG. 9 is a diagram illustrating another example of a DM-RS structure and a PTRS structure.

FIG. 9 is a diagram illustrating another example of a DM-RS structure and a PTRS structure.

Particularly, FIG. 9 shows a structure that a DMRS is transmitted in CDM scheme, and a PTRS is shared since a phase rotation for each DMRS port is the same.

In FIG. 9, 910 denotes a signal received in a receiver at (2, 4) and means a DM-RS signal to which a common phase noise is reflected on the $0^{th}$ port, and 920 denotes a signal received in a receiver at (2, 5).

Both 910 and 920 are signals received through antenna port p (p=0), and it is identified that different Orthogonal Cover Code (OCC) codes are multiplied to each of 910 and 920.

930 and 940 denote PTRSs received at (3, 4) and (4, 4), respectively.

Here, in 930, l=3 represents the first OFDM symbol to which the PTRS is allocated, and in 940, l=4 represents the second OFDM symbol to which the PTRS is allocated.

In FIG. 9, for the convenience of description, m has a starting point of the smallest index among the OFDM symbols on which a DM-RS is located.

That is, in FIG. 9, in the case that a DM-RS is located at the third OFDM symbol (l=2), m has 0 value (m=0) at the third OFDM symbol.

In addition, in FIG. 9, a phase rotation tracking value using a PTRS of port 0 is identical for all ports (p=0, 1, 2, 3).

This may be checked by Equation 13 below.

$$(H_0 P_0 - H_1 P_1) \Phi_{rx0}(1) \cdot ((H_0 P_0 - H_1 P_1) \Phi_{rx0}(0))^* = |(H_0 P_0 - H_1 P_1)|^2 \Phi_{rx0}(1) \cdot \Phi_{rx0}(0)^* \rightarrow \text{angle}(\Phi_{rx0}(1)) - \text{angle}(\Phi_{rx0}(0))$$ [Equation 13]

In summary, according to Case 1, since a phase noise is changed according to a reception antenna port, the classification for TX ports is not required for a PTRS.

That is, according to Case 1, a PTRS may be shared for all ports.

Case 2

Case 2 assumes a downlink case of multi-eNB in which a phase noise at an eNB is not considered and has the same result as Case 1 described above.

That is, according to Case 2, the classification for TX ports is not required for a PTRS.

Case 3

Case 3 assumes a single-eNB downlink case in which different phase noises are considered for each port at an eNB.

Figure 10:
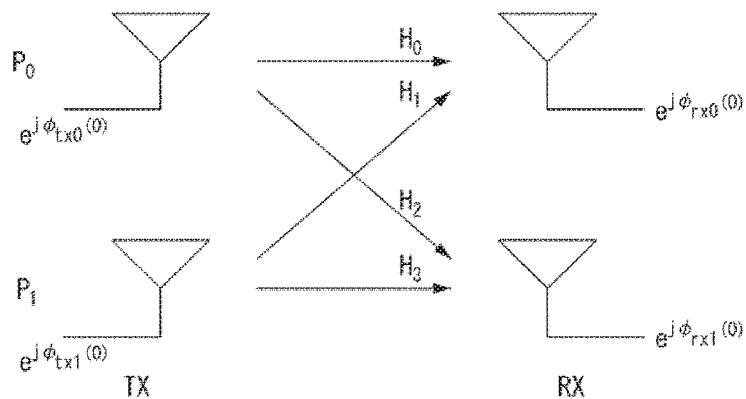
FIG. 10 is a diagram illustrating another example of an antenna configuration to which the method proposed in the present specification may be applied.

FIG. 10 is a diagram illustrating another example of an antenna configuration to which the method proposed in the present specification may be applied.

In FIG. 10, $P_0$ and $P_1$ represent precoding vectors for respective Adaptive Beamforming (ABF), H0, H1, H2 and H3 represents respective channel coefficients, $e^{j\Theta_{rxp}(1)}$ represents a phase noise for the $1^{th}$ sample in the $p^{th}$ RX antenna port, and $e^{j\Theta_{txp}(1)}$ represents a phase noise for the $1^{th}$ sample in the $p^{th}$ TX antenna port.

Figure 11:
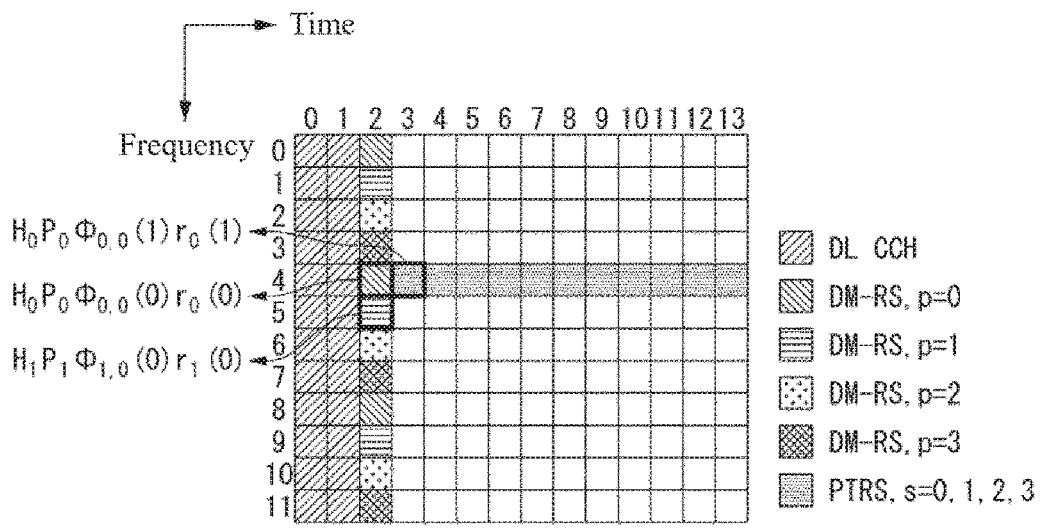
FIG. 11 is a diagram illustrating another example of a DM-RS structure and a PTRS structure.

FIG. 11 is a diagram illustrating another example of a DM-RS structure and a PTRS structure.

Particularly, FIG. 11 shows a structure that a DMRS for each port is transmitted in FDM scheme.

In FIG. 11, $\Phi_{t\bar{x}p,rxp}(m)$ represents a common phase error of the $m^{th}$ OFDM symbol in the $p^{th}$ RX antenna port in which a phase noise from $\bar{p}$th TX antenna port, L represents the number of samples per OFDM symbol, and $r_{txp}(m)$ represents a reference signal of the $m^{th}$ OFDM symbol from the $p^{th}$ TX antenna port.

In FIG. 11, a phase rotation tracking value using the PTRS of Port 0 is different from the phase rotation at Port 1.

This may be checked by Equation 14 below.

$$H_0 P_0 \Phi_{0,0}(1) \cdot (H_0 P_0 \Phi_{0,0}(0))^* = |H_0 P_0|^2 \Phi_{0,0}(1) \cdot \Phi_{0,0}(0)^* \rightarrow \Delta_{0,0} = \text{angle}(\Phi_{0,0}(1)) - \text{angle}(\Phi_{0,0}(0)) \Rightarrow \Delta_{1,0} \neq \Delta_{0,0} \because \Phi_{1,0}(m) \neq \Phi_{0,0}(m)$$ [Equation 14]

Accordingly, a PTRS needs to be defined independently for each port.

Figure 12:
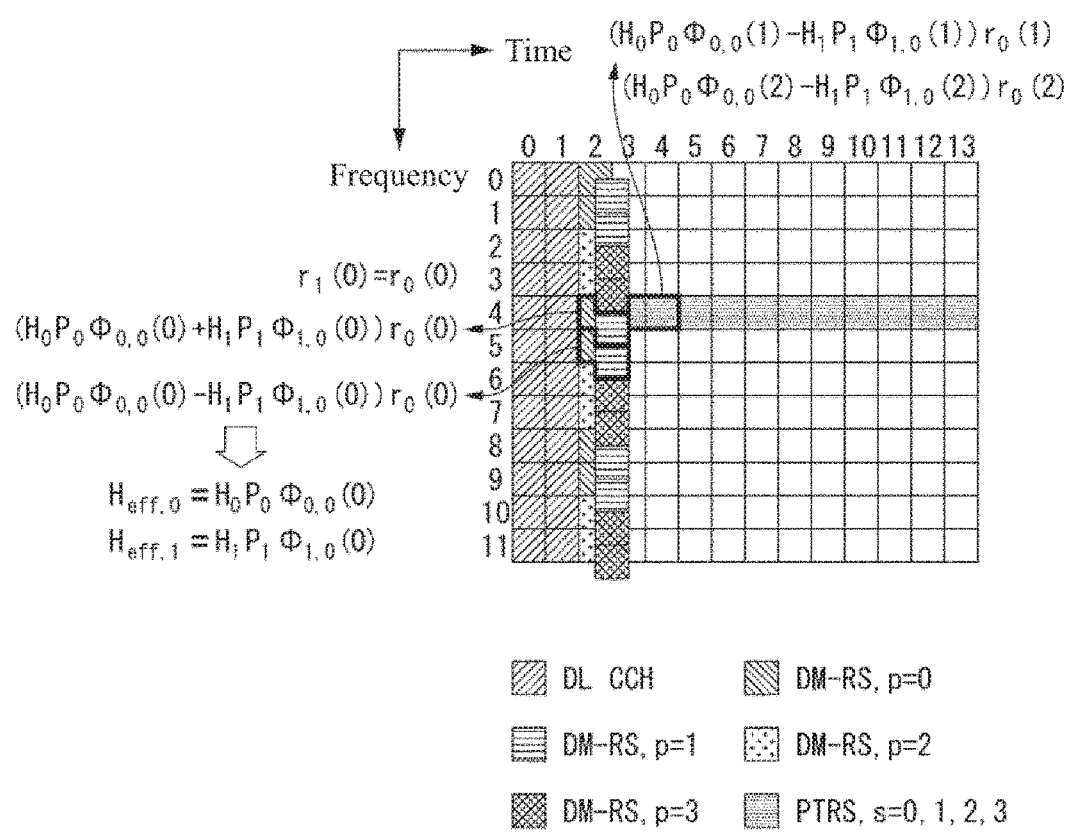
FIG. 12 is a diagram illustrating another example of a DM-RS structure and a PTRS structure.

FIG. 12 is a diagram illustrating another example of a DM-RS structure and a PTRS structure.

Particularly, FIG. 12 shows a structure that a DMRS is transmitted in CDM scheme.

In FIG. 12, since different phase rotations for Port 0 and Port 1 are added, different from Case 1 described above, there is a difficulty in tracking a reception signal.

This may be checked by Equation 15 below.

$$(H_0 P_0 \Phi_{0,0}(1) - H_1 P_1 \Phi_{1,0}(1)) \cdot ((H_0 P_0 \Phi_{0,0}(0) - H_1 P_1 \Phi_{1,0}(0)))^* = |H_0 P_0|^2 \Phi_{0,0}(1) \cdot \Phi_{0,0}(0)^* + |H_1 P_1|^2 \Phi_{1,0}(1) \cdot \Phi_{1,0}(0)^* - H_0 P_0 (H_1 P_1)^* \Phi_{0,0}(1) \Phi_{1,0}(0)^* - H_1 P_1 (H_0 P_0)^* \Phi_{1,0}(1) \Phi_{0,0}(0)^*$$ [Equation 15]

As described above, according to Case 3, since a phase noise is changed according to a transmission antenna port, the classification for TX ports is required for a PTRS.

Case 4

Case 4 assumes a downlink case of multi-eNB in which different phase noises are considered for each port at an eNB and has the same result as Case 3 described above.

Case 5

Case 5 assumes a single-eNB downlink case in which an identical phase noise is considered for all ports at an eNB.

Figure 13:
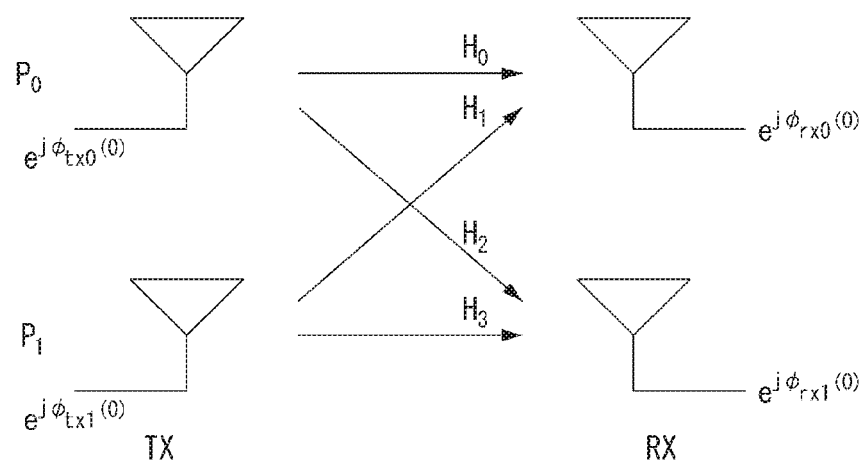
FIG. 13 is a diagram illustrating another example of an antenna configuration to which the method proposed in the present specification may be applied.

FIG. 13 is a diagram illustrating another example of an antenna configuration to which the method proposed in the present specification may be applied.

In FIG. 13, $P_0$ and $P_1$ represent precoding vectors for respective Adaptive Beamforming (ABF), H0, H1, H2 and H3 represents respective channel coefficients, $e^{j\Theta_{rxp}(1)}$ represents a phase noise for the $1^{th}$ sample in the $p^{th}$ RX antenna port, and $e^{j\Theta_{txp}(1)}$ represents a phase noise for the $1^{th}$ sample in the $p^{th}$ TX antenna port.

Figure 14:
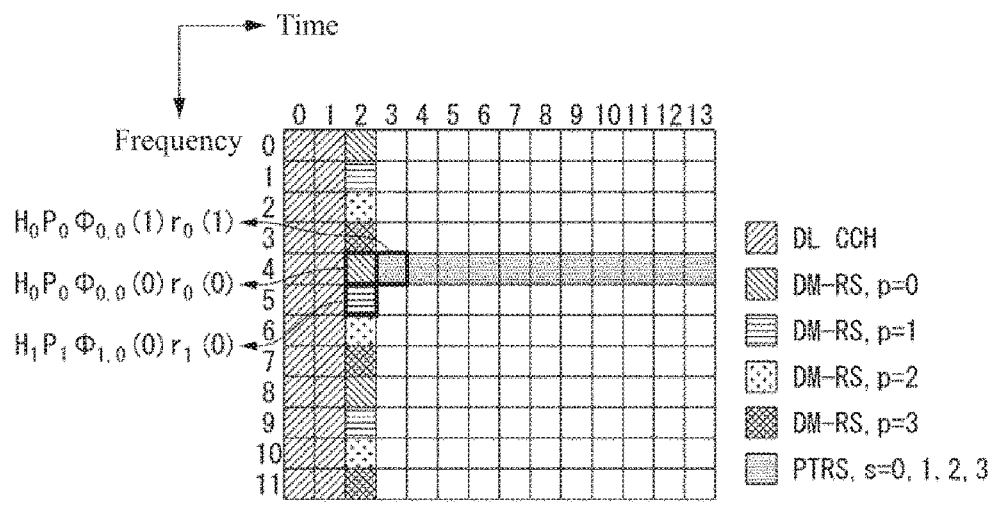
FIG. 14 is a diagram illustrating another example of a DM-RS structure and a PTRS structure.

FIG. 14 is a diagram illustrating another example of a DM-RS structure and a PTRS structure.

Particularly, FIG. 14 shows a structure that a DMRS for each port is transmitted in FDM scheme.

In FIG. 14, $\Phi_{t\bar{x}p,rxp}(m)$ represents a common phase error of the $m^{th}$ OFDM symbol in the $p^{th}$ RX antenna port in which a phase noise from $\bar{p}^{th}$ TX antenna port, L represents the number of samples per OFDM symbol, and $r_{txp}(m)$ represents a reference signal of the $m^{th}$ OFDM symbol from the $p^{th}$ TX antenna port.

In FIG. 14, a phase rotation tracking value using the PTRS of Port 0 is different from the phase rotation at Port 1.

This may be checked by Equation 16 below.

$$H_0 P_0 \Phi_{0,0}(1) \cdot (H_0 P_0 \Phi_{0,0}(0))^* = |H_0 P_0|^2 \Phi_{0,0}(1) \cdot \Phi_{0,0}(0)^* \rightarrow \Delta_{0,0} = \text{angle}(\Phi_{0,0}(1)) - \text{angle}(\Phi_{0,0}(0)) \Rightarrow \Delta_{1,0} = \Delta_{0,0} \cdot \Phi_{1,0}(m) = \Phi_{0,0}(m)$$ [Equation 16]

Figure 15:
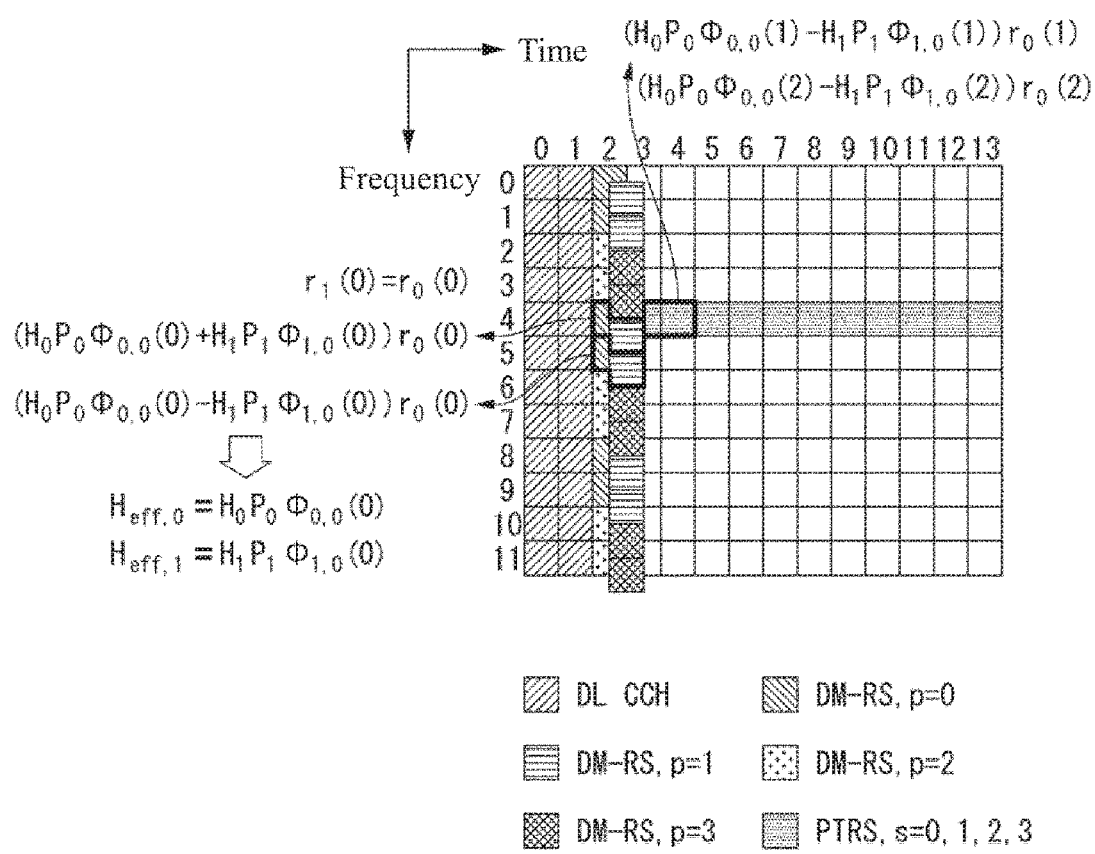
FIG. 15 is a diagram illustrating another example of a DM-RS structure and a PTRS structure.

FIG. 15 is a diagram illustrating another example of a DM-RS structure and a PTRS structure.

Particularly, FIG. 15 shows a structure that a DMRS is transmitted in CDM scheme.

In FIG. 15, a phase rotation tracking value using a PTRS of port 0 is identical for all ports (p=0, 1, 2, 3).

This may be checked by Equation 17 below.

$$(H_0 P_0 \Phi_{0,0}(1) - H_1 P_1 \Phi_{1,0}(1)) \cdot$$
$$((H_0 P_0 \Phi_{0,0}(0) - H_1 P_1 \Phi_{1,0}(0)))^* =$$
$$(H_0 P_0 - H_1 P_1) \Phi_{0,0}(1) \cdot ((H_0 P_0 - H_1 P_1) \Phi_{0,0}(0))^* =$$
$$|(H_0 P_0 - H_1 P_1)|^2 \Phi_{0,0}(1) \Phi_{0,0}(0)^* \to$$
$$\text{angle}(\Phi_{0,0}(1)) - \text{angle}(\Phi_{0,0}(0))$$
$$\because \Phi_{1,0}(0) = \Phi_{0,0}(0)$$

[Equation 17]

As described above, according to Case 5, since a phase noise is determined according to a reception antenna port, the classification for TX ports is not required for a PTRS.

In addition, Case 6 assumes a multi-eNB downlink case in which an identical phase noise is considered for all ports at an eNB and has the same result as Case 3 described above.

In addition, Case 7 assumes a single-UE uplink case in which different phase noises are considered for each port at a UE and has the same result as Case 3 described above.

In addition, Case 8 assumes a multi-UE uplink case in which different phase noises are considered for each port at a UE and has the same result as Case 3 described above.

In addition, Case 9 assumes a single-UE uplink case in which an identical phase noise is considered for all ports at a UE and has the same result as Case 1 described above.

In addition, Case 10 assumes a multi-UE uplink case in which an identical phase noise is considered for all ports at a UE and has the same result as Case 3 described above.

Hereinafter, based on the contents described above, it is described a method of defining structures of DM-RS and PTRS considering the case of having different phase noises between TX ports proposed in the present specification.

The definition for a RS structure proposed in method 1, method 2, method 3 and method 4 below represents a method of reducing RS overhead by defining an identical PTRS for different ports, and at the same time, tracking and compensating each phase noise impairment by using independent PTRS for each port, if it is required.

Particularly, method 1 to method 4 represents method of sharing a PTRS in the case that a DM-RS is transmitted by CDM scheme.

(Method 1)

DM-RS transmission port (p=$n_0$, $n_0+1$, . . . , $n_0+v-1$) is transmitted in the CDM manner.

(Method 2)

The DM-RS port (p=$n_0$, $n_0+1$, . . . , $n_0+v-1$) which is transmitted in the CDM manner shares a PTRS.

(Method 3)

A UE assumes that a phase noise of the DM-RS port (p=$n_0$, $n_0+1$, . . . , $n_0+v-1$) which is transmitted in the CDM manner is identical and performs a procedure of tracking and compensating a reception signal.

(Method 4)

A UE assumes that phase noises of the DM-RS ports $p_0 = \{n_0, n_0+1, \ldots, n_0+v-1\}$ and $p_1 = \{n_1, n_1+1, \ldots, n_1+v-1\}$ which are not CDMed with each other are different and tracks and compensates a phase noise impairment of each port from the PTRS which is given in each CDM group.

In Method 1, $n_0$,v means a unit of port being CDMed with the forefront port index among the ports which are CDMed, respectively.

$p_0$, $p_1$ of Method 4 means a single port index among $n_0$, $n_0+1$, . . . , $n_0+v-1$ and a single port index among $n_1$, $n_1+1$, . . . , $n_1+v-1$, respectively.

Further, the 'CDM group' of Method 4 means a set of TX ports that share an identical PTRS with being CDMed with each other.

That is, according to method 1 to method 4 above, ports in the same CDM group share a PTRS, and ports in different CDM group do not share a PTRS.

Figure 16:
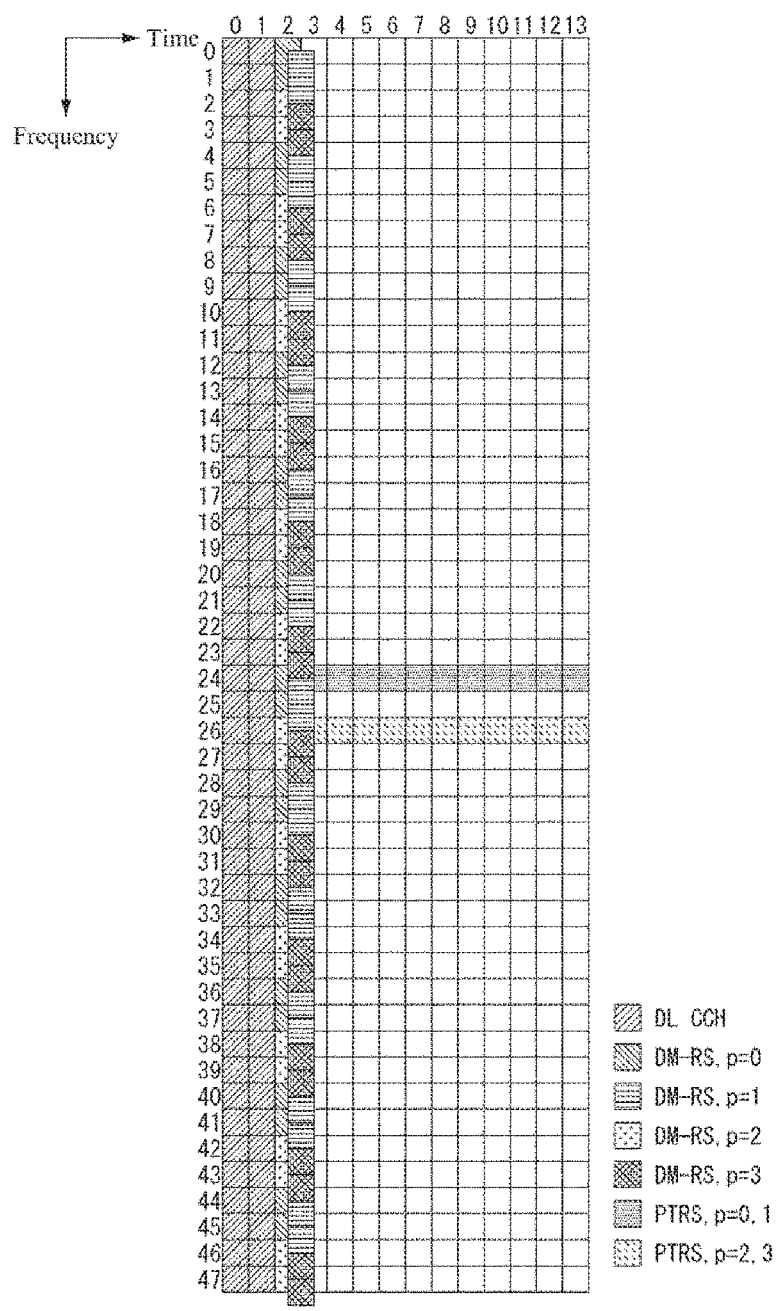
FIGS. 16 and 17 are diagrams illustrating examples of a DM-RS structure and a PTRS structure proposed in the present specification.
Figure 17:
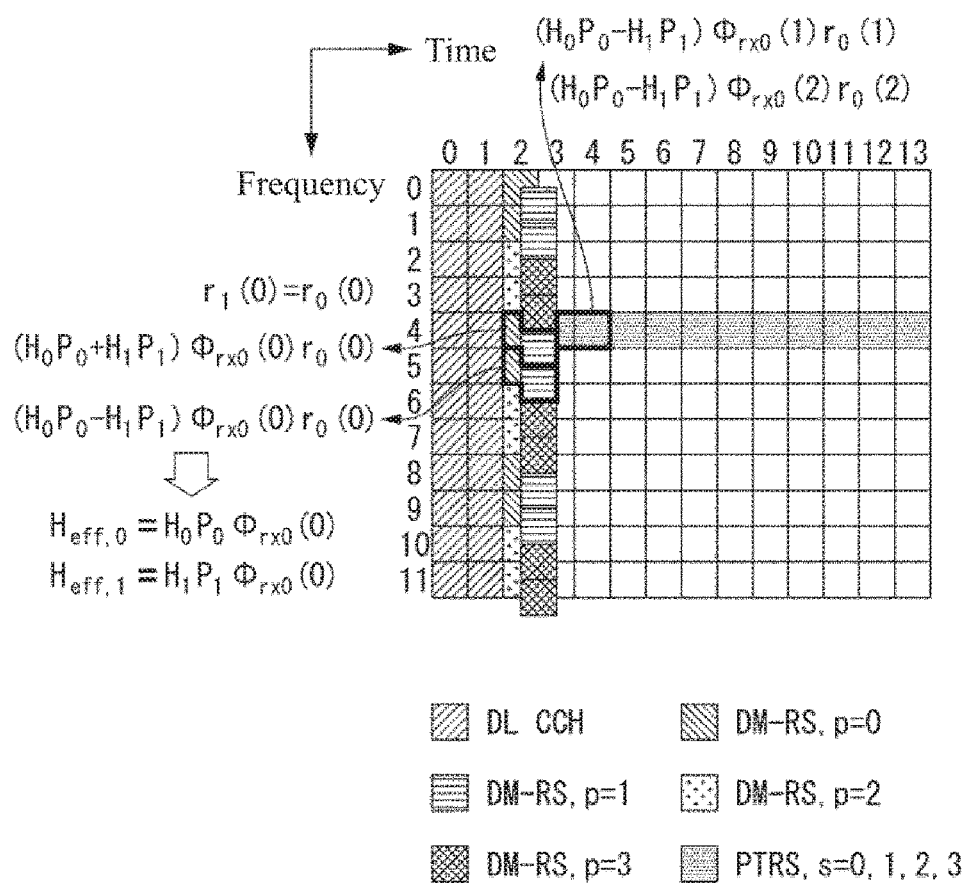

FIGS. 16 and 17 are diagrams illustrating examples of a DM-RS structure and a PTRS structure proposed in the present specification.

Particularly, FIG. 16 show an example of Method 1 and Method 2 described above.

In FIG. 16, $n_0$,$n_1$,v represent 0, 2, 2, respectively.

Method 4 described above assumes that a PTRS is not shared between DM-RS ports which are not CDMed with each other.

In FIG. 16, DM-RS ports 0 and 1 share a PTRS of subcarrier index 24 and DM-RS ports 1 and 2 share a PTRS of subcarrier index 26.

However, in FIG. 16, in the case that the same eNB transmits SU-MIMO of 4 layers or more, the eNB may also share a PTRS between DM-RS ports which are not CDMed with each other.

Accordingly, the eNB may inform the information that a PTRS is shared between DM-RS ports which are not CDMed to a UE through DCI and/or RRC signaling.

That is, in the case that the UE (or receiver) tracks a phase noise after the UE receives the PTRS sharing information from the eNB, the UE may track and compensate an influence on the phase noise by using a specific PTRS resource only.

As shown in FIG. 16, sharing a PTRS for a CDMed port may have the following advantage.

In the case that an eNB transmits a MU-MIMO, UE a may track a phase rotation between adjacent symbols by using a PTRS without information for UE b which is MU-MIMO paired.

In the case, the information for UE b may mean a DM-RS port index, reference signal, and the like for UE b.

FIG. 17 illustrates a diagram for describing an advantage of tracking a phase rotation between adjacent symbols by using a PTRS without information for a UE which is MU-MIMO paring described above and represents an example of a DM-RS structure and a PTRS structure proposed in the present specification.

Method 5 to Method 10 to be described below may be interpreted as specific contents for Method 1 to Method 4.

(Method 5)

Hereinafter, through Method 5, a method of utilizing a DM-RS and a PTRS without regard to MU-MIMO pairing will be described in more detail.

As a first process, a receiver assumes a transmission of CDM signal and performs a detection process when detecting a DM-RS for a DM-RS transport port (p=$n_0$, $n_0+1$, . . . , $n_0+v-1$) transmitted in the CDM manner.

The corresponding process may be described by distinguishing (1) the case that a CDM transmission is performed and (2) the case that a CDM transmission is not performed.

First, the case that a CDM transmission is performed is described.

Equation 18 below represents an example of a process of detecting a channel coefficient by using a DM-RS for UE a that uses DM-RS port p=0 in FIG. 17.

That is, Equation 18 represents an example of a detection process of an effective channel that uses a CDM DM-RS (in Case 1).

In addition, Equation 18 below is classified into step 1 and step 2.

[Equation 18]

$$(H_0P_0+H_1P_1)\Phi_{rx0}(0)r_0(0)r_0(0)^* = (H_0P_0+H_1P_1)\Phi_{rx0}(0) = \Psi^{f(4)}(0)$$

$$(H_0P_0-H_1P_1)\Phi_{rx0}(0)r_0(0)r_0(0)^* = (H_0P_0-H_1P_1)\Phi_{rx0}(0) = \Psi^{f(5)}(0) \quad \text{[step 1]}$$

$$(\Psi^{f(5)}(0)+\Psi^{f(4)}(0))/2 = H_0P_0\Phi_{rx0}(0)H_{\mathit{eff},0} \quad \text{[step 2]}$$

Next, the case that a CDM transmission is not performed (i.e., the case that only a transmission of a specific port is performed) is described.

Equation 19 below represents an example of detecting a channel coefficient by using a DM-RS for UE a that uses DM-RS port p=0 in FIG. 17.

In this case, a DM-RS transmission for DM-RS port p=1 is not actually occurred.

That is, Equation 19 represents an example of a detection process of an effective channel that uses a CDM DM-RS (in Case 2).

Likewise, Equation 19 below is classified into step 1 and step 2.

[Equation 19]

$$H_0P_0\Phi_{rx0}(0)r_0(0)r_0(0)^* = H_0P_0\Phi_{rx0}(0) = \tilde{\Psi}^{f(4)}(0)$$

$$H_0P_0\Phi_{rx0}(0)r_0(0)r_0(0)^* = H_0P_0\Phi_{rx0}(0) = \tilde{\Psi}^{f(5)}(0) \quad \text{[step 1]}$$

$$(\tilde{\Psi}^{f(5)}(0)+\tilde{\Psi}^{f(4)}(0))/2 = H_0P_0\Phi_{rx0}(0)H_{\mathit{eff},0} \quad \text{[step 2]}$$

As a second process, the receiver tracks a phase difference between two symbols through a conjugate multiplication of $l^{th}$ OFDM symbol and $(l+1)^{th}$ OFDM symbol for a frequency tone f(x) on which a PTRS is transmitted.

That is, the receiver does not track an effective channel directly using a reference signal but tracks the phase difference between two symbols only.

Further, the receiver tracks an effective channel for each OFDM symbol by reflecting a channel coefficient (refer to the first process) which is tracked by using a DM-RS with the tracked phase difference.

The corresponding process may also be described by distinguishing (1) the case that a CDM transmission is performed and (2) the case that a CDM transmission is not performed.

First, the case that a CDM transmission is performed is described.

Equation 20 below represents an example of a process of detecting a phase difference between adjacent symbols by using a PTRS for UE a that uses DM-RS port p=0 in FIG. 17.

That is, Equation 20 represents an example of a detection process of a phase rotation between neighboring OFDM symbols that use a CDM PTRS (in Case 1).

Likewise, Equation 20 below is classified into step 1 and step 2.

[Equation 20]

$$(H_0P_0-H_1P_1)\Phi_{rx0}(0)r_0(0) = Y^{f(5)}(0)$$

$$(H_0P_0-H_1P_1)\Phi_{rx0}(1)r_0(1) = Y^{f(5)}(1)$$

$$Y^{f(5)}(1)\cdot(Y^{f(5)}(0))^* = |(H_0P_0-H_1P_1)|^2\Phi_{rx0}(1)\Phi_{rx0}(0)^*r_0(0)r_0(1)^* = \Omega^{f(5)}(1) \quad \text{[Step 1]}$$

if $r_0(0)r_0(1)^*=1$ $$H_{\mathit{eff},0}(1) = H_{\mathit{eff},0}(0)\cdot\text{angle}(\Omega^{f(5)}(1)) \quad \text{[Step 2]}$$

Next, the case that a CDM transmission is not performed (i.e., the case that only a transmission of a specific port is performed) is described.

Equation 21 below represents an example of detecting a phase difference between adjacent symbols by using a PTRS for UE a that uses DM-RS port p=0 in FIG. 17.

In this case, a PTRS transmission for DM-RS port p=1 is not actually occurred.

That is, Equation 21 represents an example of a detection process of a phase rotation between neighboring OFDM symbols that use a CDM PTRS (in Case 2).

Likewise, Equation 21 below is classified into step 1 and step 2.

[Equation 21]

$$H_0P_0\Phi_{rx0}(0)r_0(0) = Y^{f(5)}(0)$$

$$H_0P_0\Phi_{rx0}(1)r_0(1) = Y^{f(5)}(1)$$

$$Y^{f(5)}(1)\cdot(Y^{f(5)}(0))^* = |H_0P_0|^2\Phi_{rx0}(1)\Phi_{rx0}(0)^*r_0(0)r_0(1)^* = \Omega^{f(5)}(1) \quad \text{[Step 1]}$$

if $r_0(0)r_0(1)^*=1$ $$H_{\mathit{eff},0}(1) = H_{\mathit{eff},0}(0)\cdot\text{angle}(\Omega^{f(5)}(1)) \quad \text{[Step 2]}$$

As described above, Method 5 assumes $r_0(0)r_0(1)^*=1$ when a phase rotation between adjacent symbols is tracked by using a PTRS resource without regard to a transmission of a port which is actually CDMed.

Accordingly, for applying Method 5, Method 6 below is proposed.

(Method 6)

Method 6 is a method that a PTRS for each DM-RS port uses a DM-RS symbol located at a frequency tone identical to the frequency tone on which a PTRS is defined, in the case that a PTRS is transmitted by using a PTRS resource which is shared in a specific CDM group.

That is, in Method 6, a symbol identical to a DM-RS symbol is used as a PTRS symbol.

Here, the meaning that a DM-RS symbol and a PTRS symbol are identical represents the meaning that to DM-RS signal and a PTRS signal are identical.

That is, it may be interpreted that a PTRS signal uses the same signal as a DMRS signal.

Figure 18:
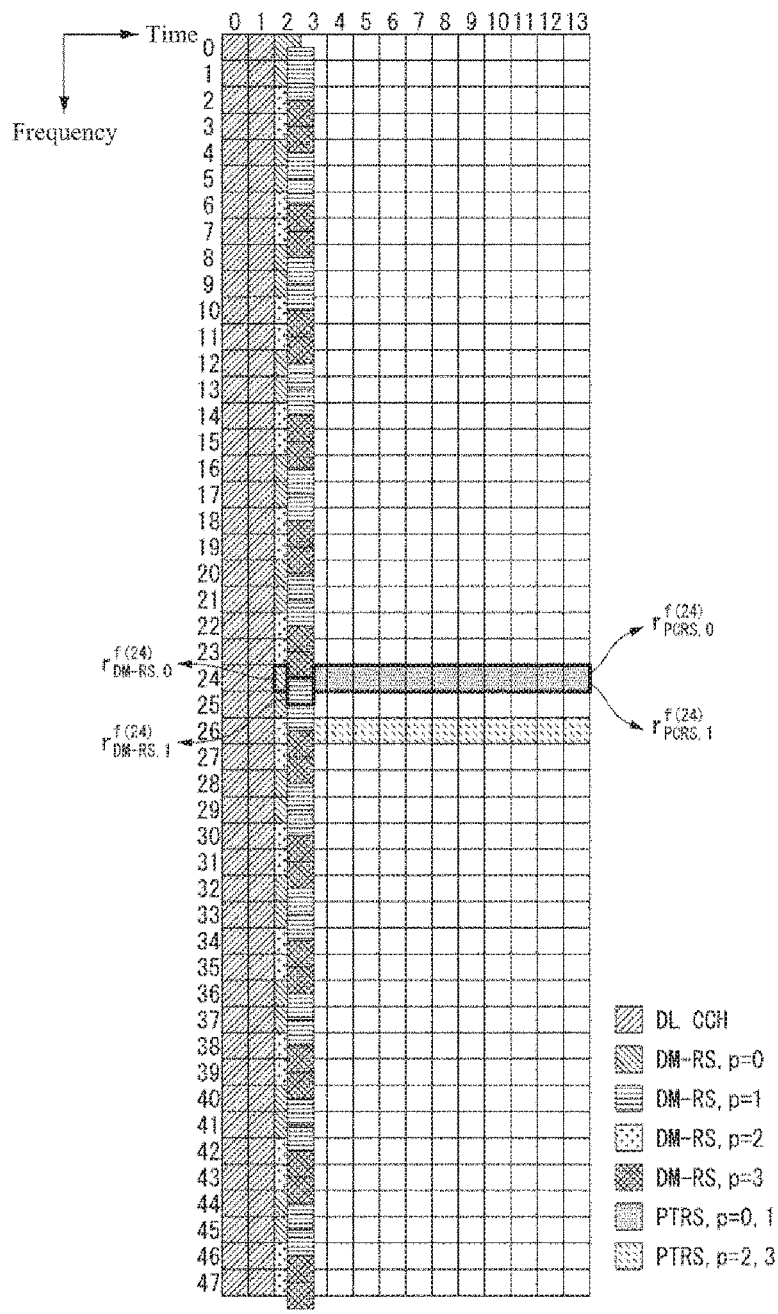
FIG. 18 is a diagram illustrating an example of a PTRS symbol structure proposed in the present specification.

FIG. 18 is a diagram illustrating an example of a PTRS symbol structure proposed in the present specification.

In FIG. 18, $r_{PCRS,m}^{f(x)}$ and $r_{DM-RS,m}^{f(x)}$ represent a PTRS symbol and a DM-RS symbol of $m^{th}$ OFDM symbol of $x^{th}$ frequency tone, respectively.

Furthermore, since Method 6 uses Method 5, according to Method 5, it is satisfied that $r_{PCRS,0}^{f(24)} = r_{DM-RS,0}^{f(24)}$ and $r_{PCRS,1}^{f(24)} = r_{DM-RS,1}^{f(24)}$.

(Method 7)

As represented in Equation 20 above, in the case that PTRSs for different DM-RS ports are transmitted with being CDMed, the corresponding resource (time, frequency or code) has a channel which is different from that of DM-RS port.

Accordingly, in such a case, Method 7 defines the PTRS resource with a new port which is different from a DM-RS for a PTRS resource.

Figure 19:
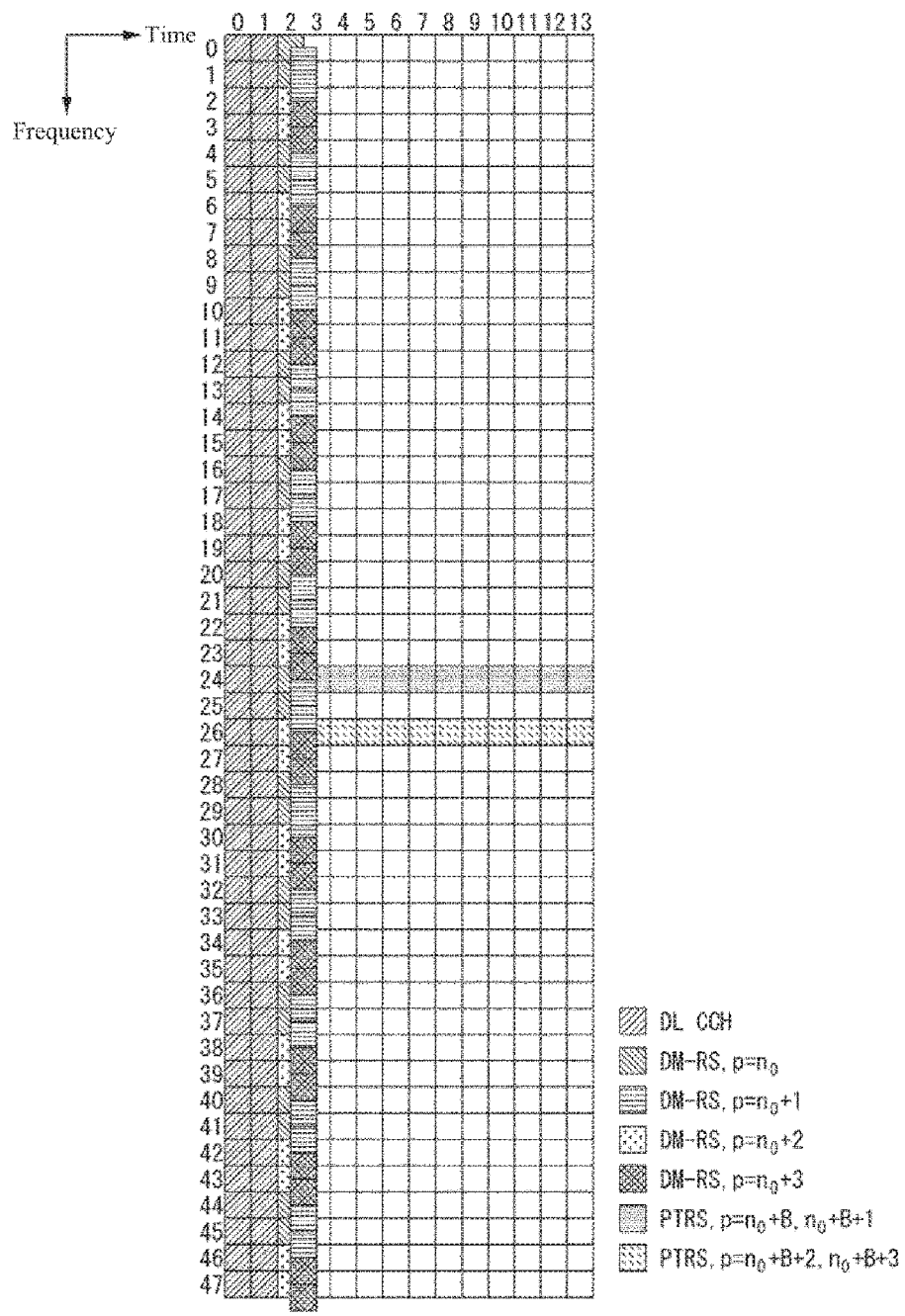
FIG. 19 is a diagram for describing Method 7 and illustrates an example of defining different ports with each other between a DM-RS port and a PTRS port proposed in the present specification.

FIG. 19 is a diagram for describing Method 7 and illustrates an example of defining different ports with each other between a DM-RS port and a PTRS port proposed in the present specification.

In FIG. 19, $n_0$, B represent different or the same specific constant value.

As such, in the case that a port for DM-RS and a port for PTRS are separated and defined, there is an advantage that an RS may be defined in accordance with the property of each RS or a receiver process may be performed.

For example, whereas RSs are orthogonally defined as much as the number of ports for DM-RS, a plurality of ports may share a single PTRS for PTRS.

In addition, for DM-RS, an effective channel between a transmitter and a receiver is tracked using a RS sequence promised between the transmitter and the receiver, but for PTRS, only a phase rotation between adjacent RSs may be tracked.

PTRS Structure for Multi-eNB or Multi-UE Transmission

Next, as another embodiment proposed in the present specification, a PTRS structure for Multi-eNB or Multi-UE transmission is described.

When a PTRS is defined for a phase rotation tracking, defining a plurality of PTRSs has a disadvantage of increasing overhead of an RS significantly.

Accordingly, by defining a minimum PTRS, a method of minimizing overhead of an RS is required.

Particularly, for a UE greatly restricted in a price and an energy efficiency, a phase noise may occur greatly owing to the device property, but for an eNB, an influence of a phase noise may be relatively small owing to the device property which is better than the UE.

As such, in the case that a phase noise of an eNB may not be considered, overhead of a PTRS may be reduced significantly, which is required for transmitting a downlink signal.

Hereinafter, it is described a structure of PTRS that may minimize overhead of RS proposed in the present specification by various methods.

(Method 8)

Method 8 is a method for transmitting a PTRS which is a reference signal for compensating impairment due to a phase noise, when transmitting a downlink signal.

In this case, the PTRS is defined in any one of subcarrier tones in which a DM-RS is defined.

Figure 20:
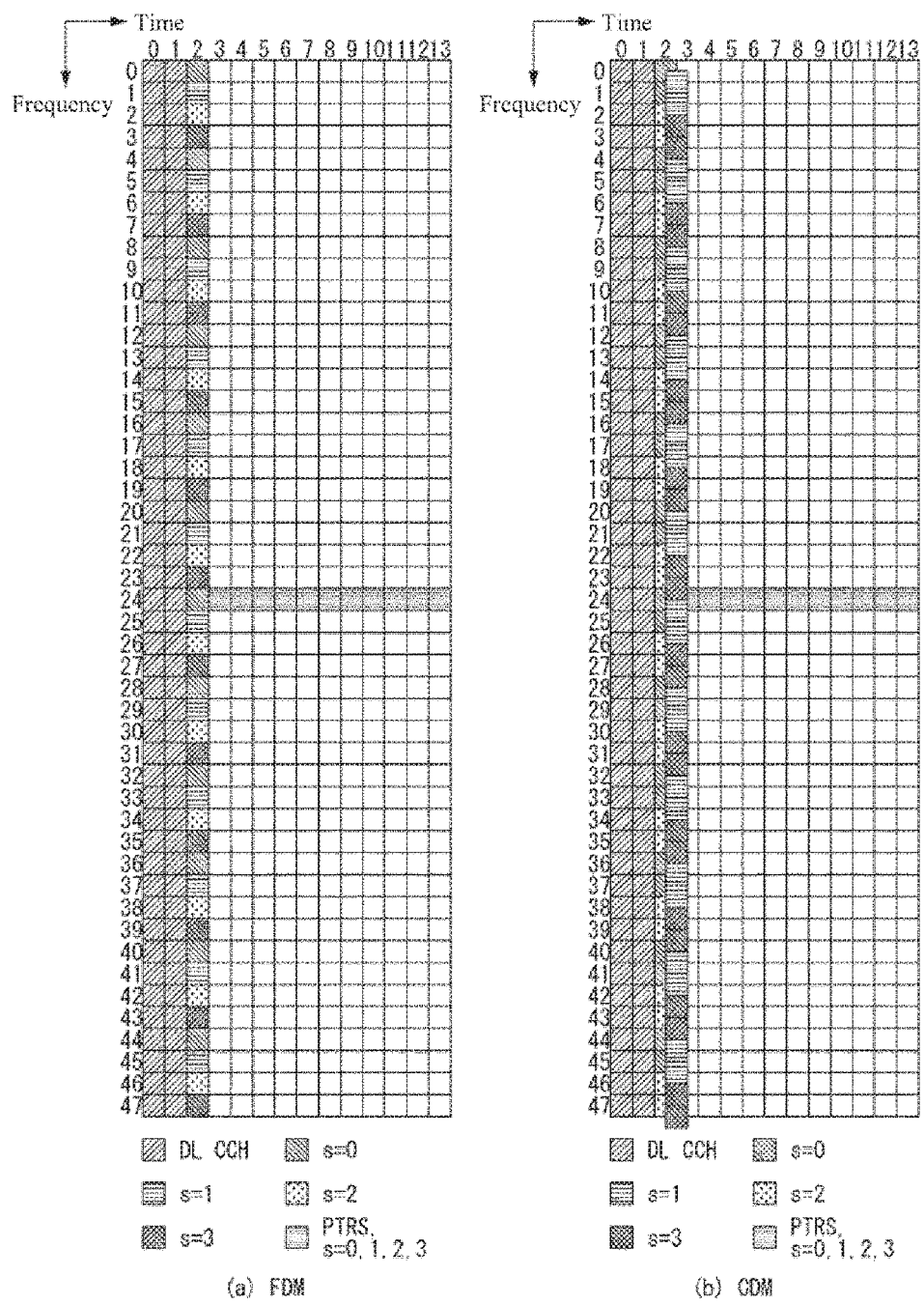
FIG. 20 is a diagram illustrating Method 8 and illustrates an example of a PTRS structure considering low RS overhead and the same transport phase noise proposed in the present specification.

FIG. 20 is a diagram illustrating Method 8 and illustrates an example of a PTRS structure considering low RS overhead and the same transport phase noise proposed in the present specification.

Particularly, FIG. 20a shows an example of the FDM scheme, and FIG. 20b shows an example of the CDM scheme.

Depending on a situation, the impairment due to a phase noise may be considered even in an eNB or a transmitter.

In such a case, in the transmission scenario using multiple eNBs, to estimate the impairment due to a phase noise from each eNB, reference signals which are orthogonal need to be defined.

However, it may be defined that the number of orthogonal PTRSs defined per unit RB is equal to or greater than the number of maximum eNBs that performs a multi-eNB transmission.

A definition method of a PTRS which is proper to such a case may be defined as represented in Method 9 below.

(Method 9)

Method 9 is another method for transmitting a PTRS which is a reference signal for compensating impairment due to a phase noise, when transmitting a downlink signal.

In this case, it may be defined that the number of orthogonal PTRSs defined per unit RB is equal to or greater than the number of maximum eNBs that performs a multi-eNB transmission.

In addition, in the case of performing a multi-eNB transmission, a UE identifies whether to transmit a PTRS for each eNB, and the eNB transmits the corresponding information to the UE through DCI or RRC signaling such that the UE may demodulate the corresponding PTRS.

Later, the UE compensates phase noise impairment occurred from each eNB signal by demodulating the PTRS based on the information related to whether to perform a multi-eNB transmission received from the eNB and receives data.

Figure 21:
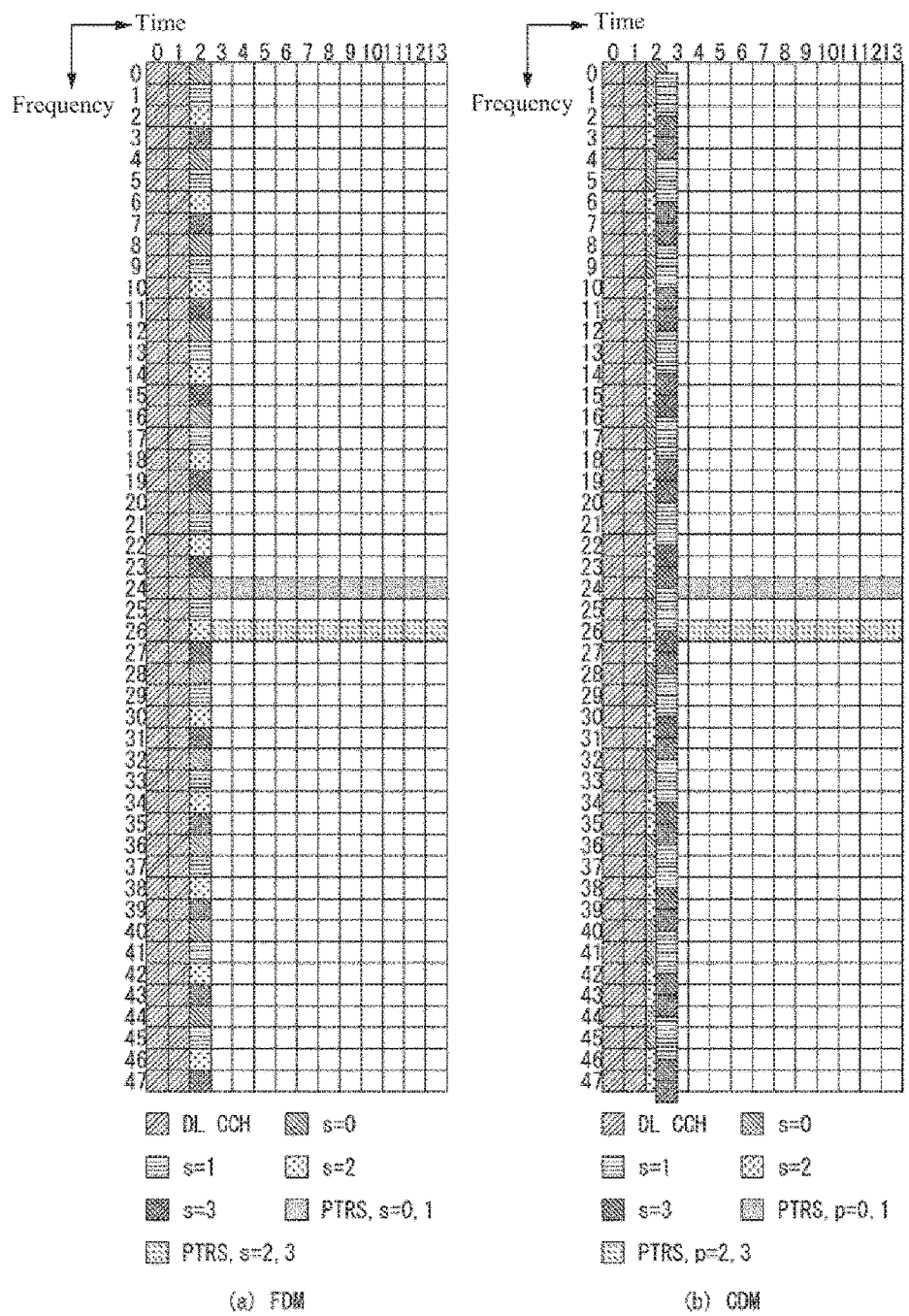
FIG. 21 is a diagram illustrating Method 9 and illustrates an example of a PTRS structure considering low RS overhead and different transport phase noises proposed in the present specification.

FIG. 21 is a diagram illustrating Method 9 and illustrates an example of a PTRS structure considering low RS overhead and different transport phase noises proposed in the present specification.

Particularly, FIG. 21a shows an example of the FDM scheme, and FIG. 21b shows an example of the CDM scheme.

As shown in FIG. 21, an eNB is available to perform maximum 4-layer transmission to a single UE.

As such, in the case that a signal transmission is performed by a single eNB, the UE may track and compensate phase noise impairment by using a PTRS defined for layer 0.

That is, for a single eNB transmission, with only a PTRS transmission defined in $24^{th}$ frequency tone, the UE may track the phase noise impairment.

In addition, as shown in FIG. 21, in the case that multi-eNB transmission is performed, it is available for maximum two eNBs, and each eNB may perform 2-layer transmission.

As such, in the case of performing multi-eNB transmission, the eNB needs to transmit the corresponding information (whether to perform multi-eNB transmission) to the UE through DCI or RRC signaling.

That is, the eNB needs to signal on whether to use the $26^{th}$ frequency tone to the UE.

For example, in the case that eNB0 and eNB1 perform multi-eNB transmission using layer 0, 1 and layer 2, 3, the PTRS defined in $24^{th}$ frequency tone may be used for tracking and compensating the phase noise impairment for eNB0, and the PTRS defined in $26^{th}$ frequency tone may be used for tracking and compensating the phase noise impairment for eNB1.

In the example above, it is assumed that different layer of the same eNB has the same phase noise.

However, the above example may also be applied to the case that different layer of the same eNB has different phase noise.

For example, in the case that a single eNB performs 2-layer transmission to a single UE, the eNB performs the transmission using layer 0 and layer 2.

In this case, MU-MIMO for two UEs is available.

For example, for MU-MIMO of performing 1-layer transmission to each of two UEs, the eNB may performs the transmission using layer 0 and layer 1 to each UE.

Furthermore, for MU-MIMO of performing 2-layer transmission to each of two UEs, the eNB may performs the transmission using (layer 0, layer 2) and (layer 1, layer 3) to each UE.

For the case of uplink transmission, a simultaneous transmission scenario from multiple UEs may be considered.

In this case, a signal transmitted from each UE includes phase noise impairment due to an oscillator of the UE.

Accordingly, to track and compensate the phase noise impairment from each UE properly, a PTRS resource which is orthogonal to each UE needs to be allocated.

A method of defining a PTRS proper to the case is described in detail through Method 10 below.

(Method 10)

Method 10 is another method for transmitting a PTRS which is a reference signal for compensating impairment due to a phase noise, when transmitting an uplink signal.

In this case, it may be defined that the number of orthogonal PTRSs defined per unit RB is equal to or greater than the number of maximum UEs that performs a multi-UE transmission.

In addition, in the case of performing a multi-UE transmission, an eNB transmits the information for a PTRS layer allocated to each UE through DCI or RRC signaling.

That is, based on the PTRS layer information received from the eNB, a UE transmits a PTRS using a PTRS resource which is mapped to the corresponding layer.

The eNB compensates phase noise impairment occurred from each UE by demodulating the PTRS allocated to each UE and receives data.

An embodiment of Method 10 may use the embodiment of Method 9 described above.

That is, as described in the embodiment of Method 9, a single UE is available to perform maximum 4-layer transmission.

As such, in the case that a signal transmission is performed by a single UE, the UE may track and compensate phase noise impairment by using a PTRS defined for layer 0.

That is, for a single UE transmission, with only a PTRS transmission defined in 24th frequency tone, the UE may track the phase noise impairment.

In addition, in the case that multi-UE transmission is performed, it is available for maximum two UE, and each UE may perform 2-layer transmission.

As such, in the case of performing multi-UE transmission, the eNB needs to transmit the information for a PTRS resource to be used by each UE to the UE through DCI or RRC signaling.

That is, the eNB needs to signal on whether to use a PTRS of 24th frequency tone or the 26th frequency tone to the UE.

For example, in the case that UE0 and UE1 perform multi-UE transmission using layer 0, 1 and layer 2, 3, the eNB signals to use the PTRS defined in $24^{th}$ frequency tone to UE0 and use the PTRS defined in $26^{th}$ frequency tone to UE1.

And, when the eNB receives uplink data from the UE, the PTRS defined in $24^{th}$ frequency tone is used for tracking and compensating the phase noise impairment for UE0, and the PTRS defined in $26^{th}$ frequency tone is used for tracking and compensating the phase noise impairment for UE1.

In the example above, it is assumed that different layer of the same UE has the same phase noise.

However, the above example may also be applied to the case that different layer of the same UE has different phase noise.

For example, in the case that a single UE performs 2-layer transmission to a single eNB, the UE performs the transmission using layer 0 and layer 2.

Figure 22:
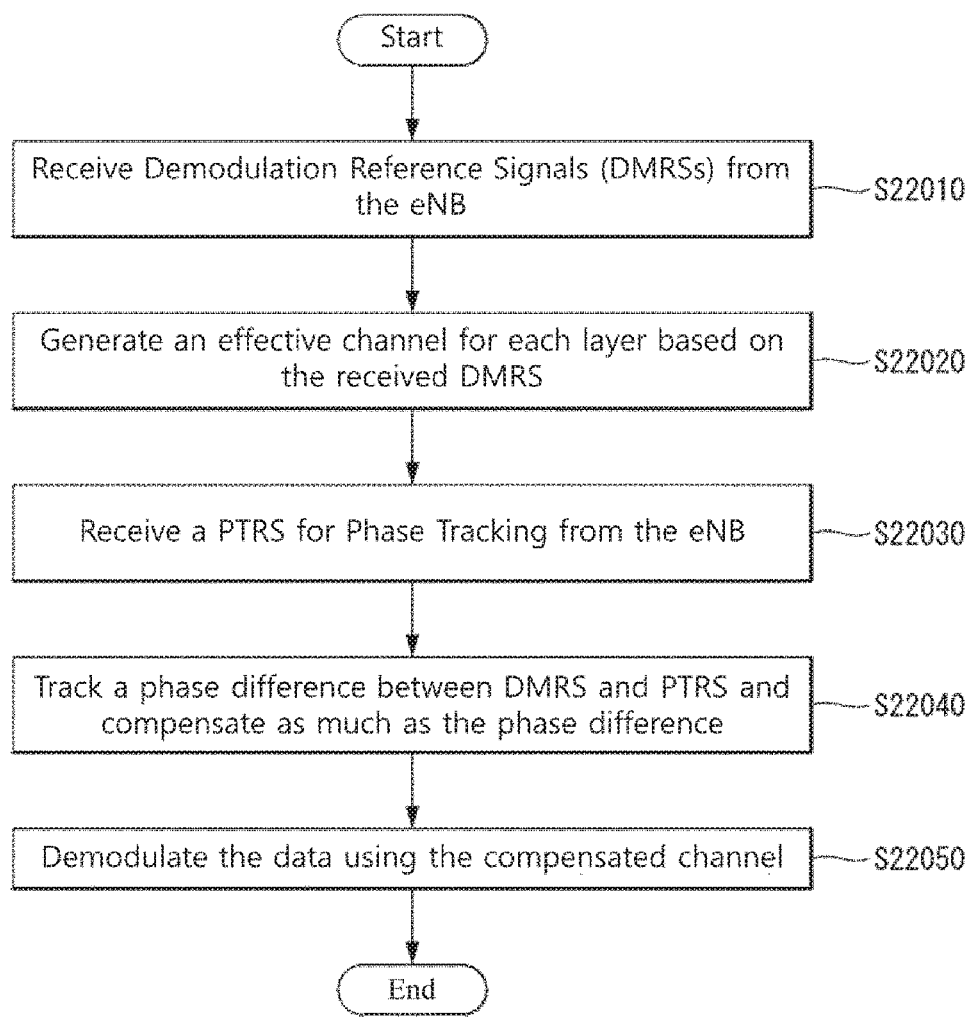
FIG. 22 is a flowchart illustrating an example of a method for tracking a phase rotation using a PTRS proposed in the present specification.

FIG. 22 is a flowchart illustrating an example of a method for tracking a phase rotation using a PTRS proposed in the present specification.

Referring to FIG. 22, a UE may compensate a channel by tracking a phase rotation using a DMRS and a PTRS transmitted from an eNB.

Particularly, the UE may receive one or more Demodulation Reference Signals (DMRSs) from the eNB (step, S22010).

Here, the one or more DMRSs may be transmitted through at least one antenna port, and the DMRS transmitted through the same antenna port may be disposed on the same layer. In addition, the DMRS may be disposed on different frequency tones of the same symbol in a specific pattern.

Since resources are allocated orthogonally for each antenna port through which one or more DMRSs are transmitted, the DMRSs may be disposed on an identical frequency tone for each layer.

Later, the UE generates an effective channel for each layer based on the received DMRS (step, S22020) and receives a PTRS used for tracking a phase rotation from the eNB in a specific resource region (step, S22030).

The specific resource region may be set to at least one frequency tone among the frequency tones on which DMRSs are transmitted in a frequency domain and set to at least one symbol after the DMRS symbol in a time domain.

The specific resource region may be set to at least one frequency tone among the frequency tones on which the DMRSs are transmitted in a frequency domain and set to at least one symbol after the DMRS symbol in a time domain.

Later, the UE receives a plurality of PTRSs for tracking a phase rotation occurred in the effective channel of each symbol in the specific resource region from the eNB (step, S22030).

The specific resource region on which the PTRS is transmitted is set to at least one frequency tone among the frequency tones on which the DMRSs are transmitted in a frequency domain and set to at least one symbol after the DMRS symbol in a time domain.

The PTRS transmitted through the at least one frequency tone which is set may have the same signal structure as the DMRS transmitted in the at least one frequency tone which is set.

In addition, the antenna port through which the PTRS is transmitted and the antenna port through which the DMRS may be identical or different with each other.

An identical or different PTRS may be transmitted for each antenna port, and different PTRSs may be transmitted through an identical resource region on different antenna ports.

The UE performs a phase tracking by using the DMRS and the PTRS received from the eNB (step, S22040). That is, the UE tracks the phase rotation of the PTRS symbol occurred owing to a phase noise using the DMRS and the PTRS and compensate the channel as much as the phase difference which is tracked.

For example, the UE tracks the effective channel of the symbol on which the PTRS is transmitted using the received PTRS. Later, the UE tracks a difference between the effective channel tracked using the PTRS and the effective channel tracked using the DMRS and compensate the tracked effective channel using the PTRS as much as the tracked phase rotation.

The UE may receive data from the eNB using the compensated channel and demodulate the data (step, S22050).

Using such a method, in the case that a DMRS is disposed on a specific symbol to perform decoding fast, there is an effect of compensating the phase rotation due to the phase noise that may occur in symbols that use a DMRS channel after the DMRS.

Figure 23:
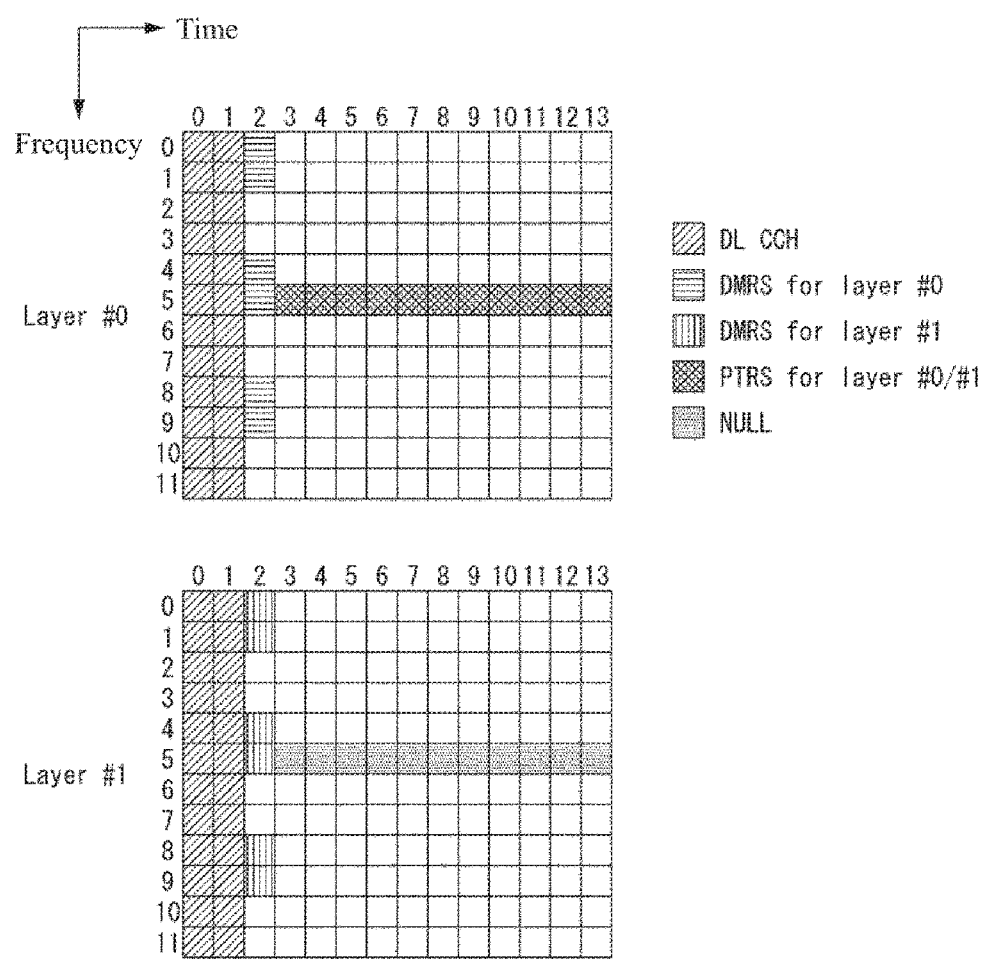
FIG. 23 is a diagram illustrating an example of a method for multiple antenna ports to share a PTRS proposed in the present specification.

FIG. 23 is a diagram illustrating an example of a method for multiple antenna ports to share a PTRS proposed in the present specification.

Referring to FIG. 23, a phase tracking may be performed in an antenna port through which multiple DMRSs are transmitted, using a PTRS transmitted on a specific layer.

Particularly, the PTRS for tracking a phase noise on multiple antenna ports may be set only on a specific layer. That is, the DMRS port for transmitting a DMRS may share a single PTRS port.

Multiple DMRS ports on which different DMRSs are transmitted and a single PTRS port on which a PTRS is transmitted may be associated or tied with each other.

An operation of phase tracking to compensate a phase noise for all multiple DMRS ports associated with or tied with a PTRS port may be available from a single PTRS port.

For example, in the case that DMRS ports 7 and 8 are associated with or tied with PTRS port 60 or DMRS ports 9 and 10 are associated with or tied with PTRS port 61, a phase tracking operation on DMRS ports 7 and 8 or DMRS ports 9 and 10 may be performed through PTRS port 60 or 61.

In this case, an RS sequence may be defined for each PTRS port. Particularly, a generation scheme of the RS sequence may be predetermined between transmitter/receiver. For example, the RS sequence may be generated by using a PTRS port number, a DMRS port number, an ID of UE, a subframe index and/or a slot index, and the like.

The eNB may transmit information for generating the RS sequence through L1, L2 and/or L3 signaling, and the UE may generate the RS sequence by using the information transmitted from the eNB.

The UE may derive the RS sequence from a PTRS port allocated to the UE itself through the method described above and track a reception effective channel of a Resource Element (RE) on which a PTRS is transmitted from the derived RS sequence.

Later, the UE may track a phase difference between symbols (e.g., OFDM symbol, etc.) generated owing to a phase noise on each effective channel by comparing the tracked effective channel and the effective channel tracked from the DMRS.

Equation 22 below represents an example of a transmission signal and a reception signal.

$$\begin{bmatrix} y_u(k,l) \\ y_{u+1}(k,l) \end{bmatrix} = \begin{bmatrix} e^{j\varphi_u(l)} h_u^T(k,l) \\ e^{j\varphi_{u+1}(l)} h_{u+1}^T(k,l) \end{bmatrix} [p_i \ p_{i+1}] \begin{bmatrix} x_i(k,l) \\ x_{i+1}(k,l) \end{bmatrix}$$ [Equation 22]

In Equation 22, u represents an index of a reception antenna port, k represents an index of a subcarrier, l represents a position of an OFDM symbol and i represents an index of a layer.

$y_u(k,l)$ represents a reception signal, $h_u^T(k,l)$ represents a channel vector, $e^{j\varphi_u(l)}$ represents a Common Phase Error (CPE) for a reception antenna port (or UE), $p_i$ is a precoding vector and $x_i(k,l)$ is a transmission signal.

The CPE means a phase rotation value which is occurred owing to a phase noise in each OFDM symbol.

For example, as shown in FIG. 23, in the case that a PTRS is transmitted only on layer 0 between layers 0 and 1, the PTRS shares layers 0 and 1, and a transmission signal and a reception signal for the DMRS and the PTRS is represented as below.

Transmission Signal:

$x_0(4,2) = r_{DMRS,4}, x_0(5,2) = r_{DMRS,5}, x_0(5,3) = r_{PTRS,5}, x_1(4,2) = r_{DMRS,4}, x_1(5,2) = -r_{DMRS,5}, x_1(5,3) = 0$

Reception Signal in a PTRS Region:

$y_u(k,l) = e^{j\varphi_u(l)} h_u^T(k,l) p_i x_i(k,l), y_{u+1}(k,l) = e^{j\varphi_{u+1}(l)} h_{u+1}^T(k,l) p_i x_i(k,l)$ In this case, a reception signal in each reception port in the PTRS region may be represented as Equation 23 below (k=5, l=3, ..., 13).

$y_0(k,l) = e^{j\varphi_0(l)} h_0^T(k,l) p_0 x_0(k,l)$ $y_1(k,l) = e^{j\varphi_1(l)} h_1^T(k,l) p_0 x_0(k,l)$ In Equation 23, $x_1(k,l) = 0$.

And, $\Delta\varphi_u(l)$, which represents a phase difference between an OFDM symbol in which a DMRS symbol is existed and the $l^{th}$ OFDM symbol in which a PTRS is transmitted, may be tracked using Equation 24 below.

$$\Delta\varphi_u(l) = \text{angle}\left(\sum_k \bar{y}_{u,0}(k,l)\left(\hat{h}_{\text{eff},u,0}(k,l_{DM-RS})\right)^*\right)$$ [Equation 24]

Here, $\bar{y}_{u,s}(k,l)$ may be identical to $y_u(k,l)(x_s(k,l))^*$, and interference between subcarriers and AWGN are not considered herein.

$\hat{h}_{\text{eff},u,s}(k,l)$ represents an effective channel tracking value for $s^{th}$ DMRS port and $u^{th}$ reception antenna and may be calculated using Equation 25.

$\hat{h}_{\text{eff},u,s}(k,l) = e^{j\varphi_u(l)} h_u^T(k,l) p_s$ [Equation 25]

The UE may track a phase rotation owing to a phase noise by using the DMRS and the PTRS transmitted from the eNB. In this case, since the PTRS is transmitted only on layer 0 between layers 0 and 1, the UE may track a phase rotation by using one of the following two methods.

First, the UE may track a phase rotation by applying the phase rotation tracked in a reception antenna of layer 0 to a reception antenna of layer 1 in the same manner. In this case, the phase noise source of the reception antenna of layer 0 and the reception antenna of layer 1 need to be the same.

Second, the UE may track a phase rotation in each reception antenna. In this case, the UE may share a PTRS sequence by defining a PTRS shared by antenna ports of each layer as a common port.

As such, in the case that multiple DMRS ports share a single PTRS port, since a PTRS is transmitted only on a single layer, 3 dB boosting may be available.

As described above, in the case that a phase noise source is the same, a PTRS may be shared. However, in the case that precoders for different UEs are different in MU-MIMO and accordingly, there is little mutual signal interference (e.g., Orthogonal Precoder), a case may occur that it is unable to receive the shared PTRS.

Hereinafter, to solve the problem, it is described a method for transmitting a PTRS in each antenna port.

Figure 24:
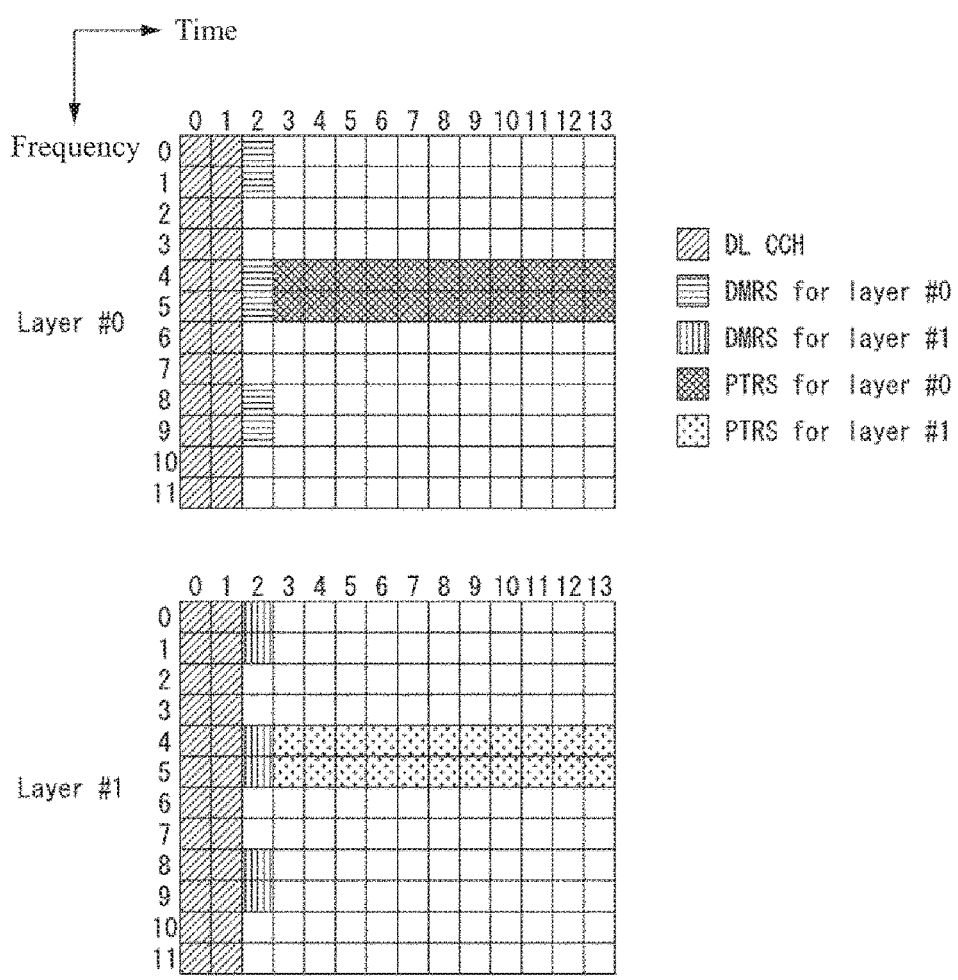
FIG. 24 is a diagram illustrating an example of transmitting a PTRS by using the Code Division Multiplexing (CDM) proposed in the present specification.

FIG. 24 is a diagram illustrating an example of transmitting a PTRS by using the Code Division Multiplexing (CDM) proposed in the present specification.

Referring to FIG. 24, a PTRS transmitted on different antenna ports may be configured in the same resource region of each layer using the CDM scheme.

Particularly, after DMRSs, which are demodulation reference signals of each layer, are disposed on each layer with a specific pattern using the CDM scheme, a PTRS may be disposed for tracking a phase rotation in the same specific resource region of each layer.

In this case, the specific resource region may be configured in a specific frequency tone among the frequency tones on which the DMRS is disposed in a frequency domain and configured in at least one symbol after a DMRS symbol in a time domain.

That is, each of the PTRSs associated or tied with the DMRS ports which are CDMed shares identical time axis/frequency axis resource by using the CDM scheme.

For example, as shown in FIG. 24, a DMRS may be disposed on layers 0 and 1 in the CDM scheme, and a PTRS may be disposed on frequency tone indexes 5 and 6 of each layer.

That is, a transmission signal for a PTRS in FIG. 24 may be as represented below.

Transmission Signal:

$$x_0(4,3)=r_{PTRS,4}, x_0(5,3)=r_{PTRS,5}, x_1(4,3)=r_{PTRS,4}, x_1(5,3)=r_{PTRS,5}$$

As such, in the case that PTRSs on different antenna ports are disposed on an identical resource region using the CDM scheme, the UE may receive the PTRS through the identical resource region, and accordingly, scheduling information of other UEs, which is scheduled with the UE, may not be transmitted to the UE separately.

Accordingly, owing to the signaling reduction of scheduling information, there is an effect that signaling overhead is reduced.

Figure 25:
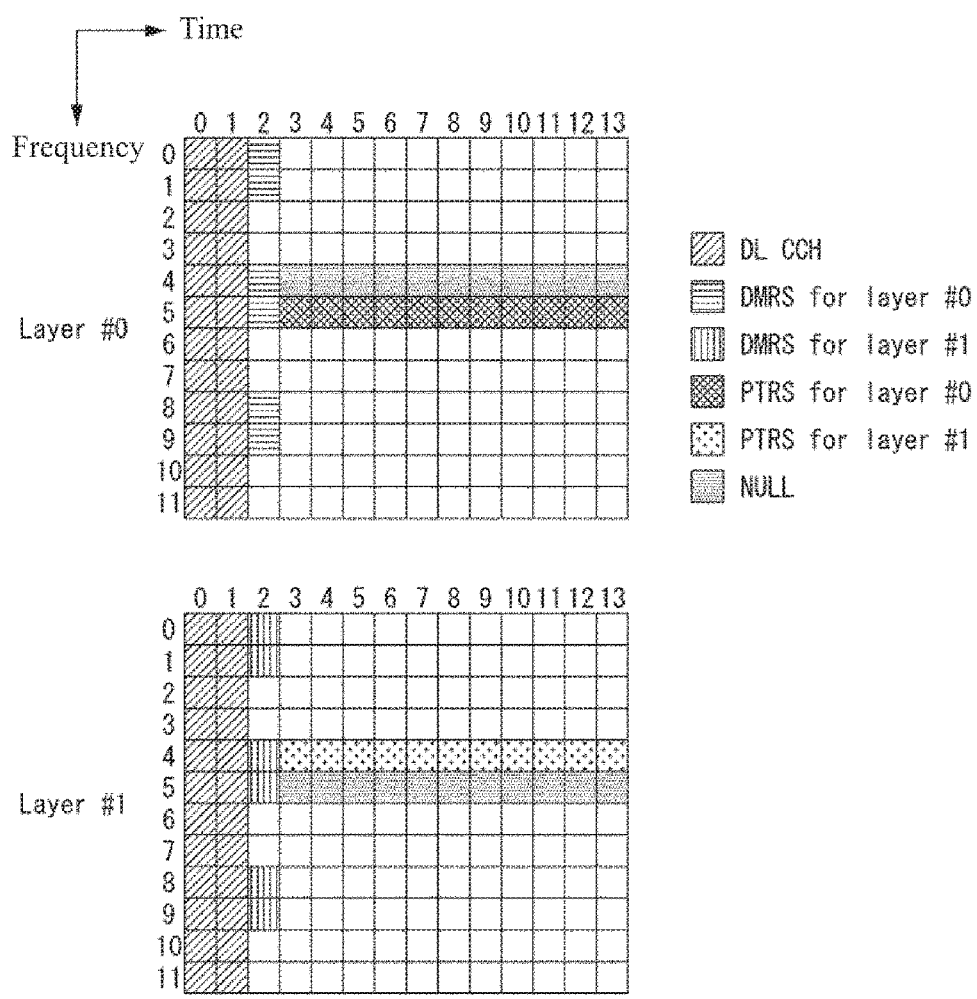
FIG. 25 is a diagram illustrating an example of transmitting a PTRS by using the Frequency Division Multiplexing (FDM) proposed in the present specification.

FIG. 25 is a diagram illustrating an example of transmitting a PTRS by using the Frequency Division Multiplexing (FDM) proposed in the present specification.

Referring to FIG. 25, a PTRS transmitted on different antenna ports may be configured in the same resource region of each layer using the FDM scheme.

Particularly, after DMRSs, which are demodulation reference signals of each layer, are disposed on each layer with a specific pattern using the CDM scheme, a PTRS may be disposed for tracking a phase rotation in the same specific resource region of each layer using the FDM scheme.

In this case, the specific resource region may be configured in a specific frequency tone among the frequency tones on which the DMRS is disposed in a frequency domain and configured in at least one symbol after a DMRS symbol in a time domain.

That is, each of the PTRSs associated or tied with the DMRS ports which are CDMed shares different time axis/frequency axis resource by using the FDM scheme.

For example, as shown in FIG. 25, in the case that a DMRS may be disposed on layers 0 and 1 in the FDM scheme, a PTRS may be disposed on frequency tone index 5 using the FDM scheme in layer 0, and a PTRS may be disposed on frequency tone index 4 in layer 1.

That is, a transmission signal for a PTRS in FIG. 25 may be as represented below.

Transmission Signal:

$$x_0(4,3)=0, x_0(5,3)=r_{PTRS,5}, x_1(4,3)=r_{PTRS,4}, x_1(5,3)=0$$

As such, in the case that PTRSs on different antenna ports are disposed on an identical resource region using the FDM scheme, the UE requires scheduling information of other UEs which is scheduled with the UE.

However, in the case of nulling the resource region which is FDMed without regard to scheduling, the UE may not receive the scheduling information of other UEs which is scheduled with the UE.

Accordingly, in the case of nulling the resource region which is FDMed, owing to the signaling reduction of scheduling information, there is an effect that signaling overhead is reduced.

Figure 26:
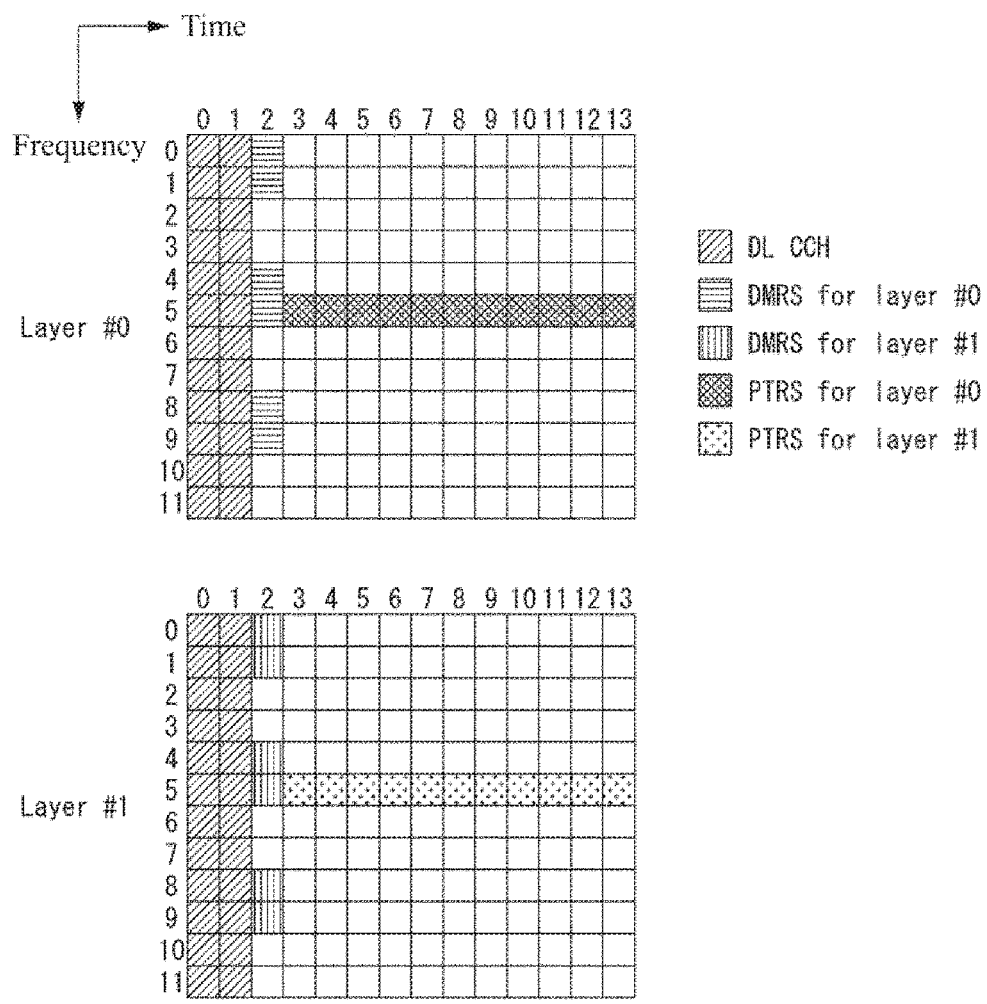
FIG. 26 is a diagram illustrating an example of a method for transmitting multiple PTRSs using an identical resource region proposed in the present specification.

FIG. 26 is a diagram illustrating an example of a method for transmitting multiple PTRSs using an identical resource region proposed in the present specification.

Referring to FIG. 26, to track a phase rotation occurred owing to a phase noise, a PTRS transmitted in each layer may be transmitted through an identical resource region.

Particularly, after DMRSs, which are demodulation reference signals of each layer, are disposed on each layer with a specific pattern using the CDM scheme, a PTRS may be disposed for tracking a phase rotation in the same specific resource region of each layer. That is, the PTRSs transmitted on different ports share a specific resource.

In this case, the specific resource region may be configured in a specific frequency tone among the frequency tones on which the DMRS is disposed in a frequency domain and configured in at least one symbol after a DMRS symbol in a time domain.

That is, each of the PTRSs associated or tied with the DMRS ports which are CDMed shares an identical time axis/frequency axis resource.

The shared PTRS means that multiple PTRS ports for transmitting PTRSs share time axis/frequency resource.

For example, as shown in FIG. 26, a DMRS may be disposed on layers 0 and 1 in the CDM scheme and a PTRS may be disposed on frequency tone index 5 of each layer.

That is, as shown in FIG. 26, two PTRS ports may share resources of k=5 and l=3, . . . , 13. Further, PTRS ports of the same layer are associated or tied with DMRS ports, respectively.

A PTRS is used only for tracking a phase difference between an OFDM symbol in which a DMRS symbol is existed and another OFDM symbol, the effective channel tracked by each DMRS is not tracked in the region (regions of k=5 and l=3, . . . , 13 in FIG. 26) in which the PTRS is transmitted.

In this case, multiple PTRS ports may share time and frequency resources to transmit PTRSs, a transmission signal and a reception signal for the PTRS may be as below.

Transmission signal: $x_0(5,3)=r_{PTRS,5}, x_1(5,3)=r'_{PTRS,5}$

Reception Signal:

$$y_u(k,l)=e^{j\varphi_u(l)}h_u^T(k,l)(p_i x_i(k,l)+p_{i+1}x_{i+1}(k,l)), y_{u+1}(k,l)=e^{j\varphi_{u+1}(l)}h_{u+1}^T(k,l)(p_i x_i(k,l)+p_{i+1}x_{i+1}(k,l))$$

The fact that PTRSs share identical time axis/frequency axis resource means that actual resource is shared, not using the multiplexing scheme such as the CDM and the FDM.

Since it is only required that a PTRS tracks a phase rotation occurred owing to a phase noise, PTRSs may occupy the same resource, different from DMRSs which are orthogonally transmitted to track an effective channel of each antenna port.

The UE may track a phase rotation value without transmitting each of PTRSs orthogonally, in the case that a source of phase noise is the same.

In the case that a source of phase noise is different, the UE may track a phase rotation value by distinguishing PTRSs transmitted different antenna ports in an identical resource region by using an effective channel for each port estimated using a DMRS.

Particularly, in Equation 26 below, the UE may track x value that represents a PTRS transmitted from each antenna port by compensating the left channel matrix using the effective channel estimated from a DMRS.

$$\begin{bmatrix} h_{1,1} & h_{1,2} \\ h_{2,1} & h_{2,2} \end{bmatrix} \begin{bmatrix} x_{PTRS,1} \\ x_{PTRS,2} \end{bmatrix}$$ [Equation 26]

As such, each of PTRS ports may be configured, which are associated or tied with DMRS ports which are CDMed to dispose PTRSs. For example, DMRS port 7 may be associated with PTRS port 30, and DMRS port 8 may be associated with PTRS port 31.

In this case, the DMRS port and the PTRS port which are associated or tied may use the same precoder. That is, the DMRS port and the PTRS port which are associated or tied may perform precoding using the same precoder.

The PTRSs transmitted through each of the PTRS ports may be transmitted by two methods as below.

First, the PTRSs transmitted through the same antenna port may be identical in all OFDM symbols. That is, the PTRSs transmitted through different symbols on the same antenna port may be the same.

In this case, the PTRSs transmitted through different antenna ports may be identical or different, and a transmission signal in each layer shown in FIG. 26 may be represented as below.

$$x_0(5,3)=x_0(5,4)=\ldots=x_0(5,13)=r_{PTRS,5},$$

$$x_1(5,3)=x_1(5,4)=\ldots=x_1(5,13)=r'_{PTRS,5}$$

Since the PTRSs of all symbol transmitted on the same antenna port is identical, the UE may track a phase difference between OFDM symbols as represented in Equation 27 below using the received PTRSs without tracking an effective channel.

$$(y_u(k,l))^* y_u(k,l+1)=e^{j(\varphi_u(l+1)-\varphi_u(l))}|h_u^T(k,l)(p_i x_i(k,l)+p_{i+1}x_{i+1}(k,l))|^2 \Delta\varphi_u(l)=\text{angle}((y_u(k,l))^* y_u(k,l+1))=(\varphi_u(l+1)-\varphi_u(l))$$ [Equation 27]

Second, the PTRSs transmitted through an identical symbol on different antenna ports may be identical. That is, DMRS ports are associated or tied with different PTRS ports, respectively. In this case, each of the PTRS ports transmits the same RS sequence.

In the case that a power boost is applied to a PTRS in MU-MIMO or SU-MIMO environment, the eNB may signal whether to boost to the UE through 1-bit DCI.

In the case that a power boost is applied to a PTRS in MU-MIMO environment, change of frequency density owing to interference may be alleviated.

In this case, the PTRSs transmitted through different symbols on the same antenna port may be different or identical, and a transmission signal of each layer shown in FIG. 26 may be as represented below.

$$x_0(5,3)=x_1(5,3)=r_{PTRS,5}$$

Since the PTRSs of all symbol transmitted on the same antenna port may be identical but the PTRSs of all symbol transmitted on the same antenna port may not be identical, the UE may an effective channel of each of the OFDM symbols and track a phase difference between effective channels of the tracked OFDM symbols as represented in Equation 28 below using the received PTRSs.

$$\bar{y}_u(k,l) = y_u(k,l)(x_i(k,l))^*$$ [Equation 28]
$$= e^{j\varphi_u(l)} h_u^T(k,l)(p_i + p_{i+1}),$$
$$\bar{y}_u(k,l+1) = y_u(k,l+1)(x_i(k,l+1))^*$$
$$= e^{j\varphi_u(l+1)} h_u^T(k,l+1)(p_i + p_{i+1})$$
$$\Delta\varphi_u(l) = \text{angle}$$
$$((\bar{y}_u(k,l))^* \bar{y}_u(k,l+1)) = \varphi_u(l+1) - \varphi_u(l)$$

In the case that $r'_{PTRS,5}=r'_{PTRS,5}$, phase difference $\Delta\varphi_u(l)$ between an OFDM symbol on which DMRS symbols are disposed and $l^{th}$ OFDM symbol may be as represented in Equation 29 below.

Herein, $\Delta\varphi_u(l)$ means a phase different between different OFDM symbols which are occurred owing to a phase noise.

$$\Delta\varphi_u(l) = \text{angle}\left(\sum_k \bar{y}_u(k,l)(\bar{y}_u(k,l_{DM-RS}))^*\right)$$ [Equation 29]

In Equation 29, $\bar{y}_u(k,l)$ may be as represented in Equation 30 below.

$$\bar{y}_u(k,l)=y_u(k,l)(x_s(k,l))^*=e^{j\varphi_u(l)}h_u^T(k,l)(p_0+P_1)$$ [Equation 30]

The first method and the second method are compared as represented in Equation 31 below.

[Equation 31]

$$E[|h_u^T(k,l)(p_i x_i(k,l)+p_{i+1}x_{i+1}(k,l))|^2]=E[|h_u^T(k,l)p_i x_i(k,l)|^2]+E[|h_u^T(k,l)p_{i+1}x_{i+1}(k,l)|^2]=1 \quad \text{First method}$$

$$E[|h_u^T(k,l)(p_i p_{i+1})|^2]=1 \quad \text{Second method}$$

As such, in the case that multiple ports share a specific resource on a time axis and a frequency axis and transmit PTRSs, multiple UEs may share a PTRS. Since a signaling related to whether a PTRS is transmitted in each layer or transmitted in a specific layer is not required, there is an effect of reducing overhead.

In addition, since the UE may not know whether a PTRS of another UE is transmitted through a symbol adjacent to a symbol in which the PTRS is transmitted, the UE may perform a transparent operation.

As another embodiment of the present invention, a DMRS port and a PTRS port associated or tied with the DMRS port may use the same precoder and use (or apply) the same Orthogonal Cover Code (OCC) or the same Discrete Fourier Transform (DFT) code.

That is, a DMRS port and a PTRS port associated or tied with the DMRS port may use the same OCC or DFT code and generate a DMRS and a PTRS.

Particularly, since different DMRSs are transmitted using the CDM scheme on different DMRS ports, the UE receives a value to which all the DMRSs transmitted in each port are added.

In this case, when different OCCs are applied to a DMRS and a PTRS, a shape of channel tracked by the UE is changed, and it is unable to track a phase rotation value.

Accordingly, a DMRS port and a PTRS port associated or tied with the DMRS port use the same OCC or DFT code and generate a DMRS and a PTRS.

For example, in FIG. 26, DMRS ports 0 and 1 may be multiplexed using the CDM scheme. In this case, a transmission signal $r_{PTRS,5}$ and $r'_{PTRS,5}$ may be defined as a multiplication of a random sequence (or ZC sequence) and an OCC (or DFT code).

$$r_{DMRS,5}=w \cdot R$$ [Equation 32]

In Equation 32, w represents an OCC (or DFT code) and R represents a random sequence (or ZC sequence).

In this case, a DMRS sequence located on the $k^{th}$ subcarrier and $r_{DMRS,k}$ and $r_{PTRS,k}$ that represent a PTRS sequence may have a relationship represented in Equation 33.

$$r_{DMRS,k}=r_{PTRS,k}, r'_{DMRS,k}=r'_{PTRS,k}$$ [Equation 33]

That is, w, which is an OCC (or DFT code) of $r_{DMRS,k}$ that represents a DMRS sequence may be identically applied to $r_{PTRS,k}$ that represents a PTRS sequence.

In this case, the UE may not perform a procedure of tracking an effective channel but track a phase difference between an OFDM symbol in which a DMRS sequence is located and an OFDM symbol in which a PTRS sequence is located using DMRS and PTRS.

Equation 34 below represents an example for tracking a phase difference.

$$\Delta\varphi_u(l) = \text{angle}\left(\sum_k y_u(k,l)(y_u(k,l_{DM-RS}))^*\right)$$ [Equation 34]

$$y_u(k,l)(y_u(k,l_{DM-RS}))^* = e^{j(\varphi_u(l)-\varphi_u(l_{DM-RS}))}$$

$$|h_u^T(k,l_{DM-RS})(p_i x_i(k,l_{DM-RS}) + p_{i+1} x_{i+1}(k,l_{DM-RS}))|^2,$$

$$\text{phase difference} = \text{angle}(y_u(k,l)(y_u(k,l_{DM-RS}))^*) =$$

$$\varphi_u(l) - \varphi_u(l_{DM-RS})$$

In Equation 34, $y_u(k,l)$ means a reception signal in $l^{th}$ OFDM symbol, $k^{th}$ subcarrier of $u^{th}$ reception antenna.

The phase difference means a phase difference between different OFDM symbols which are occurred owing to a phase noise.

In the case of tracking a phase difference using the method described above, to compensate a phase noise, only the phase rotation between a DMRS and a PTRS is tracked. That is, when tracking a phase rotation, a tracking for an effective channel may not be performed. Accordingly, in the case that a phase difference is tracked in multi-layer (or multi-port) situation, a phase difference may be tracked without separating layers (or ports), and it is available to track a phase noise without regard to whether a PTRS for another UE is allocated.

That is, when the UE tracks a phase rotation, the UE is not required to know whether there is multiplexing with another UE for a PTRS.

In addition, in multi-layer (or multi-port) situation, interference between layers (or ports) may be removed.

Figure 27:
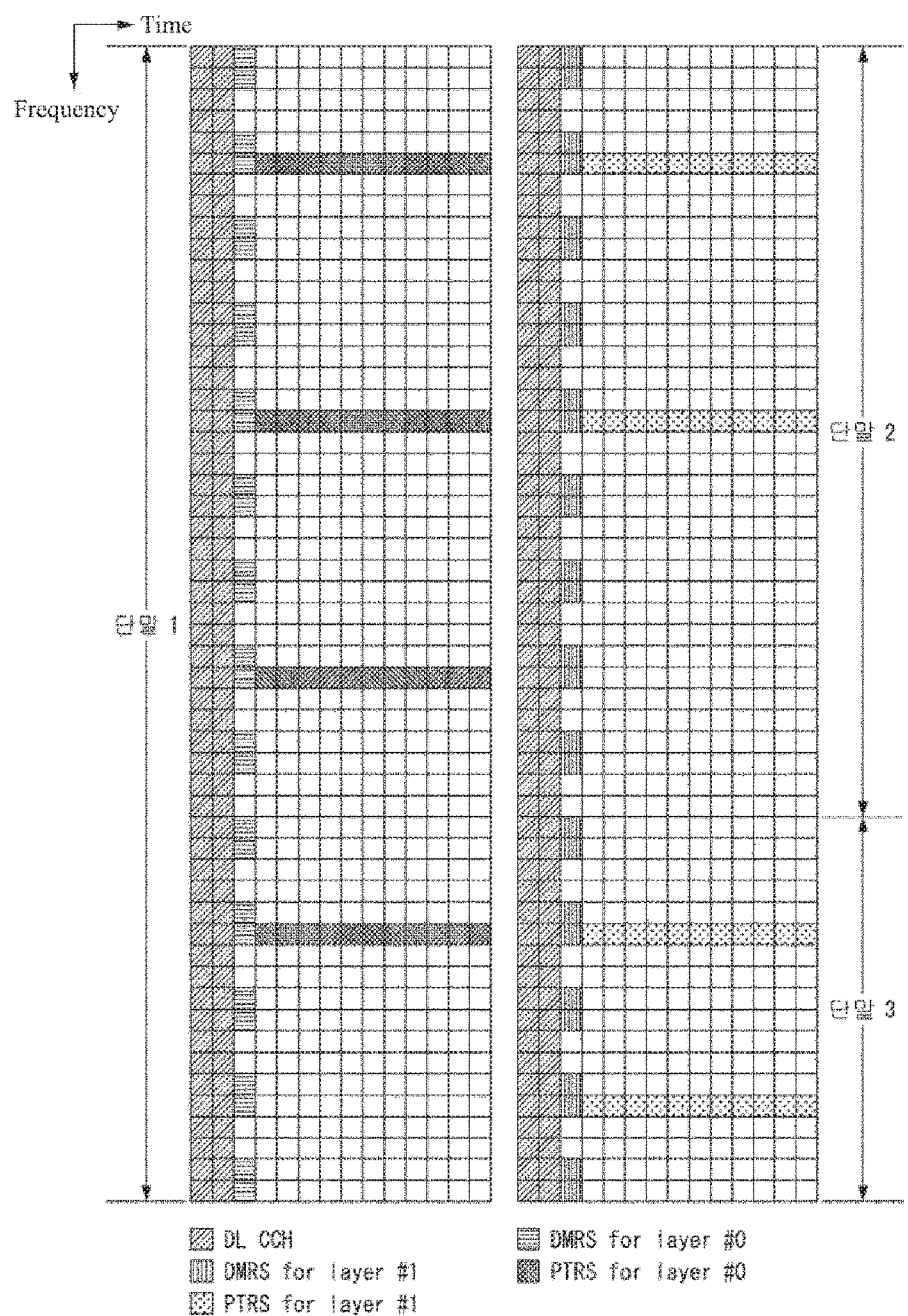
FIG. 27 is a diagram illustrating an example of a method for disposing a PTRS propose in the present specification.

FIG. 27 is a diagram illustrating an example of a method for disposing a PTRS propose in the present specification.

Referring to FIG. 27, an eNB may dispose PTRSs to OFDM symbols for each UE according to UE property.

Particularly, a disposition of PTRS may be changed according to whether a PTRS is transmitted to a single UE or a PTRS is transmitted to multiple UEs.

The Case of Transmitting Multiple Layers to a Single UE

In MU-MIMO, in the case that multiple layers are transmitted to a single UE, a PTRS may not be disposed for each layer. In this case, to reduce additional signaling overhead, a PTRS may be disposed according to an antenna port as described in FIG. 23 to FIG. 26.

The Case of Transmitting Multiple Layers to Multiple UEs

In the sharing environment in which multiple UEs shares a layer, in the case that multiple UEs are co-scheduled, each of the number of allocated PRBs and an MCS may be different among the co-scheduled UEs, and occupied band may be different with each other.

The Case that the Number of PRBs and/or MCS is Different

In the case that an optimal time pattern is different among co-scheduled UEs, UEs may receive a PTRS according to a time pattern according to the following three methods.

In this case, the time pattern may be applied to each UE through implicit or explicit signaling.

Explicit signaling method: Explicit signaling using 1 bit or 2 bits of DCI.

Implicit signaling method: Implicit signaling by a fixed value associated or tied with each of MCS and the number of PRBs.

First, among time patterns of co-scheduled UEs, the time pattern of which overhead is the greatest may be used in all UEs.

In this case, an eNB signals directly the time pattern of which overhead is the greatest to the UEs. That is, the explicit signaling method may be used.

The UE may receive a PTRS from the eNB using the time pattern transmitted from the eNB.

In this method, since the time pattern of which overhead is the greatest is applied, there is an effect of reducing interference between UEs.

Second, co-scheduled UEs may use respective optimal time patterns. In this case, both the explicit signaling method and the implicit signaling method may be used.

According to this method, each of the UEs may use its optimal time pattern, but frequency density may be changed. In this case, the RS boosting is used, and change of frequency density may be prevented.

Third, information for co-scheduled UEs is signaled to UEs, and the co-scheduled UEs may use respective optimal time pattern.

That is, scheduling information of other UEs is transmitted to UEs scheduled together, and the UEs may use the respective optimal time patterns and know the scheduling information of other UEs, and accordingly, interference may be avoided.

For example, the UE does not transmit and receive a signal on a time when other UEs transmit and receive a signal based on the scheduling information of other UEs scheduled together, and the UE may use an optimal time pattern, and further, avoid interference.

However, in the case that PTRSs sharing identical frequency axis and time axis resource use the CDM and each of the PTRSs has a property of being orthogonal with each other, that is, in the case that each of the PTRS ports is dividable, a DMRS port and a PTRS port associated or tied with the DMRS port may apply an OCC or DFT code which is not identical.

In the case that an optimal frequency density is different among the UEs which are scheduled together, a UE may know a density of PTRS according to the following two methods.

For example, as shown in FIG. 27, in the case that frequency densities of PTRS are different among UE 1, UE 2 and UE 3, a PTRS may be configured by the following two methods.

First, an eNB may configure a PTRS according to different frequency density of each UE and inform the number, position, frequency interval, and the like of the PTRS configured to the UE through DCI using an explicit signaling method.

Second, a density of PTRS may be configured according to a value which is preconfigured to an eNB and a UE according to the number of PRBs.

That is, a PTRS may be configured in each layer according to a table (or rule) shared by a UE and an eNB.

In this case, a position of PTRS in each layer in a frequency domain may be defined as below.

The corresponding number is allocated from the lowest PRB in a unit of RB (assuming that the number of PTRS tones is smaller than the allocated number of PRBs).

In this case, the position of frequency tone of PTRS is located on a tone identical to a specific tone of DMRS which is associated or tied with the allocated PTRS.

Using such a method, a PTRS configuration is simplified, and additional signaling is not required since a preconfigured table is used, and accordingly, signaling overhead is reduced.

In addition, a PTRS is configured according to a table (or a specific rule), a transparent structure of PTRS is available.

Figure 28:
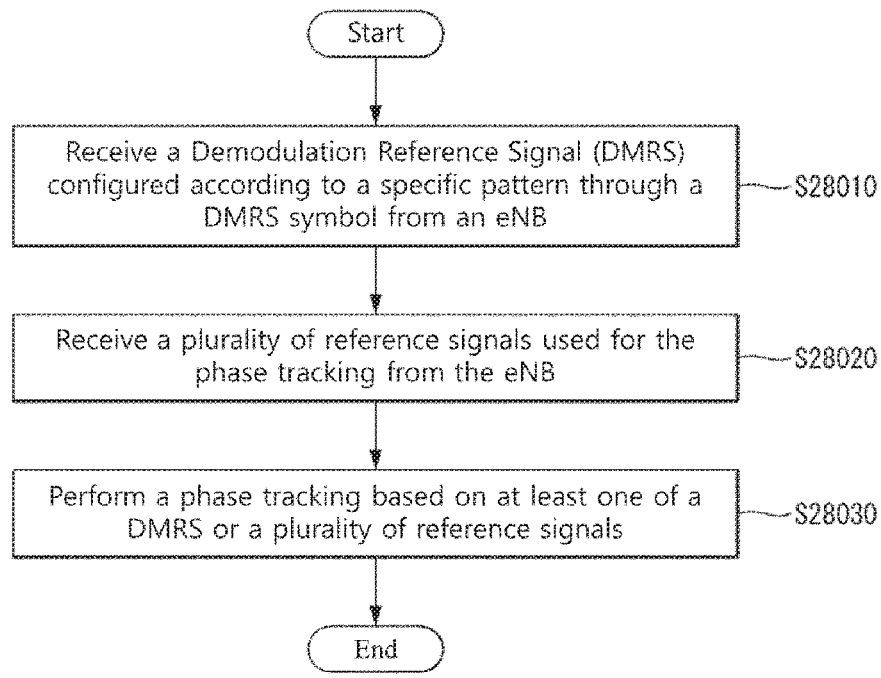
FIG. 28 is a flowchart illustrating an example of a method for a UE to track a phase rotation using a PTRS proposed in the present specification.

FIG. 28 is a flowchart illustrating an example of a method for a UE to track a phase rotation using a PTRS proposed in the present specification.

Referring to FIG. 28, a UE may track a phase rotation owing to a phase noise occurred by a DMRS being configured on a specific symbol through a DMRS and a PTRS.

Particularly, in the case that a DMRS is configured on a specific symbol with a specific pattern, a phase rotation owing to a phase noise may occur in another symbol. To track such a phase rotation, the UE receives a Demodulation Reference Signal (DMRS) configured according to a specific pattern through a DMRS symbol from an eNB (step, S28010).

In this case, as described in FIG. 8 to FIG. 27, the DMRS symbol may be configured on a specific symbol with a specific pattern.

The UE tracks an effective channel in a symbol of DMRS using the received DMRS and receives a plurality of reference signals used for the phase tracking from the eNB (step, S28020).

In this case, the reference signal may be called a PCRS, a PDRS or a PTRS and transmitted on a specific antenna port as described in FIG. 8 to FIG. 27 and configured in a specific resource region.

In addition, a plurality of DMRS ports may share a single PTRS port, and a plurality of DMRS ports may transmits a plurality of PTRSs through an identical resource region.

The UE may track an effective channel in a PTRS symbol using the received PTRS and track a phase rotation between the effective channel tracked in the DMRS symbol and the effective channel tracked in the PTRS symbol using the same method described in FIG. 23 to FIG. 26 (step, S28030).

Later, the UE may compensate the tracked phase rotation value to the effective channel and demodulate data through the compensated channel.

Using such a method, in the case that a DMRS is configured in a specific symbol and a phase noise is occurred, the phase rotation owing to the phase noise may be compensated using the PTRS for phase tracking.

Figure 29:
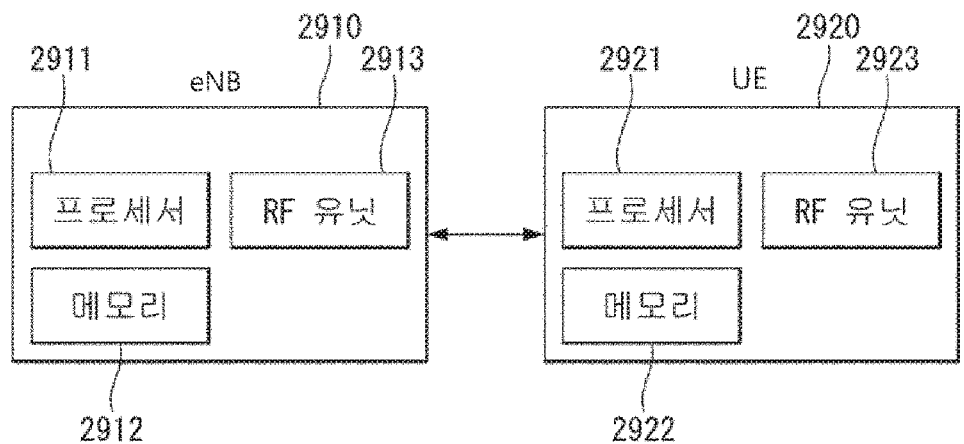
FIG. 29 is a diagram illustrating an example of the internal block diagram of a wireless device to which the present invention may be applied.

FIG. 29 is a diagram illustrating an example of the internal block diagram of a wireless device to which the present invention may be applied.

In this case, the wireless device may be an eNB and a UE, and the eNB includes both a macro eNB and a small eNB.

As shown in FIG. 29, the eNB 2910 and the UE 2920 include communication units (or transmission/reception units or RF units) 2913 and 2923, processors 2911 and 2921, and memories 2912 and 2922, respectively.

In addition, each of the eNB and the UE may further include an input unit and an output unit.

The communication unit 2913 or 2923, the processor 2911 or 2921, the input unit, the output unit, and the memory 2912 or 2922 are functionally coupled in order to perform the methods proposed in this specification.

When receiving information produced by a physical layer (PHY) protocol, the communication unit (or the transmission/reception unit or the RF unit) 2913 or 2923 moves the received information to a Radio-Frequency (RF) spectrum, performs filtering and amplification on the information, and sends the signal to an antenna. Furthermore, the communication unit moves the RF signal, received from the antenna, to a band that may be processed in the PHY protocol and performs filtering on the RF signal.

Furthermore, the communication unit may have a switch function for changing such transmission and reception functions.

The processor 2911 or 2921 implements the functions, processes and/or methods proposed in this specification. The layers of a radio interface protocol may be implemented by the processor.

The processor may be represented as a control unit, a controller, a control unit, or a computer.

The memory 2912 or 2922 is connected to the processor and stores protocols or parameters for performing an uplink resource allocation method.

The processor 2911 or 2921 may include application-specific integrated circuits (ASICs), other chipsets, logic circuits and/or data processing devices. The memory may include read-only memory (ROM), random access memory (RAM), flash memory, a memory card, a storage medium and/or other storage devices. The communication unit may include baseband circuits for processing radio signals. When an embodiment is implemented in software, the method may be implemented as a module (process or function, etc.) for performing the functions.

The module may be stored in the memory and may be executed by the processor. The memory may be positioned inside or outside the processor and may be connected to the processor by well-known means.

The output unit (or display unit or indication unit) is controlled by the processor and outputs information output by the processor along with a key entry signal generated from a key input unit and various information signals from the processor.

Furthermore, the drawings have been divided and described for convenience of description, but the embodiments described with reference to the drawings may be merged to implement a new embodiment. Furthermore, the scope of the present invention also includes designing a computer-readable recording medium in which a program for executing the above-described embodiments has been written according to the needs of those skilled in the art.

The method for transmitting and receiving reference signals according to this specification is not limitedly applied to the configurations and methods of the aforementioned embodiments, but some or all of the embodiments may be selectively combined and configured so that the embodiments are modified in various ways.

Meanwhile, the method for discovering a device based on a direction according to this specification may be implemented in a recording medium, readable by a processor included in a network device, in the form of code readable by the processor. The processor-readable recording medium includes all types of recording devices in which data readable by a processor is stored. The processor-readable recording medium may include ROM, RAM, CD-ROM, magnetic tapes, floppy disks, and optical data storages, for example. Furthermore, the processor-readable recording medium may be implemented in the form of carrier waves, such as transmission over the Internet. Furthermore, the processor-readable recording medium may be distributed to computer systems connected over a network, and code readable by a processor may be stored in the processor-readable recording medium and executed in a distributed manner.

In addition, although the preferred embodiments of this specification have been illustrated and described above, this specification is not limited to the above-described specific embodiments, and a person having ordinary skill in the art to which the present invention pertains may modify the present invention in various ways without departing from the gist of the present invention in the claims. Such modified embodiments should not be individually understood from the technical spirit or prospect of the present invention.

Furthermore, in this specification, both the apparatus invention and the method invention have been described, but the descriptions of both the inventions may be complementally—applied, if necessary.

INDUSTRIAL APPLICABILITY

The RRC connection method in a wireless communication system of the present invention has been illustrated as being applied to the 3GPP LTE/LTE-A system but may also be applied to various wireless communication systems in addition to the 3GPP LTE/LTE-A system.

What is claimed is:

1. A method for performing a phase tracking in a wireless communication system, the method performed by a User Equipment and comprising:
    receiving, from a base station, a Demodulation Reference Signal (DMRS) configured according to a specific pattern through a DMRS symbol;
    receiving, from the base station, a plurality of reference signals used for the phase tracking,
    wherein the plurality of reference signals is transmitted on a specific antenna port, and received through a specific resource region identical to at least one different reference signal transmitted on a different antenna port for the phase tracking; and
    performing the phase tracking based on at least one of the DMRS or the plurality of reference signals,
    wherein the DMRS and the plurality of reference signals are generated through identical Orthogonal Cover Code or identical Discrete Fourier Transform (DFT) code.

2. The method of claim 1, wherein the DMRS and the plurality of reference signals are precoded through an identical precoder.

3. The method of claim 1, wherein the plurality of reference signals is identical to the symbols in the specific resource region, respectively.

4. The method of claim 1, wherein the plurality of reference signals is identical to the at least one different reference signal.

5. The method of claim 1, wherein the specific resource region is configured on a frequency tone identical to the DMRS in a frequency domain.

6. The method of claim 1, further comprising:
    generating an effective channel of each symbol using the DMRS,
    wherein performing the phase tracking includes:
    tracking the generated effective channel of each symbol; and
    tracking a phase difference between symbols using one of the DMRS or the plurality of reference signals.

7. The method of claim 1, wherein the plurality of reference signals is configured according to a specific pattern in a time domain.

8. The method of claim 7, further comprising:
    receiving, from the base station, pattern information representing the specific pattern,
    wherein the specific pattern is a time pattern of which overhead is greatest between a first time pattern of the User Equipment and a second time pattern of different User Equipments scheduled with the User Equipment.

9. The method of claim 7, further comprising:
    receiving, from the base station, scheduling information of different User Equipments scheduled with the User Equipment,
    wherein the specific pattern is a time pattern of the User Equipment, and
    wherein the reference signal is transmitted in a resource region in which an interference with the different User Equipments is not occurred among the specific resource region based on the scheduling information.

10. A User Equipment for performing a phase tracking in a wireless communication system, the User Equipment comprising:
    a communication unit for transmitting and receiving a radio signal with an exterior; and
    a processor functionally connected to the communication unit,
    wherein the processor is configured to:
    receive, from a base station, a Demodulation Reference Signal (DMRS) configured according to a specific pattern through a DMRS symbol;
    receive, from the base station, a plurality of reference signals used for the phase tracking,
    wherein the plurality of reference signals is transmitted on a specific antenna port, and received through a specific resource region identical to at least one different reference signal transmitted on a different antenna port for the phase tracking; and
    performing the phase tracking based on at least one of the DMRS or the plurality of reference signals,
    wherein the DMRS and the plurality of reference signals are generated through identical Orthogonal Cover Code or identical Discrete Fourier Transform (DFT) code.

11. The User Equipment of claim 10, wherein the DMRS and the plurality of reference signals are precoded through an identical precoder.

12. The User Equipment of claim 10, wherein the processor is configured to:
    generate an effective channel of each symbol using the DMRS,
    track the generated effective channel of each symbol; and
    track a phase difference between symbols using one of the DMRS or the plurality of reference signals.

13. The User Equipment of claim 10, wherein the processor is configured to:
    receive, from the base station, pattern information representing the specific pattern,
    wherein the plurality of reference signals is configured according to a specific pattern in a time domain, and
    wherein the specific pattern is a time pattern of which overhead is greatest between a first time pattern of the User Equipment and a second time pattern of different User Equipments scheduled with the User Equipment.

* * * * *